(12) United States Patent
Cheng et al.

(10) Patent No.: US 9,304,607 B2
(45) Date of Patent: Apr. 5, 2016

(54) POINTER POSITIONING METHOD OF HANDHELD POINTER DEVICE

(71) Applicant: PIXART IMAGING INC., Hsin-Chu (TW)

(72) Inventors: Han-Ping Cheng, Hsin-Chu (TW); Chao-Chien Huang, Hsin-Chu (TW); Chia-Cheun Liang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 112 days.

(21) Appl. No.: 14/318,627

(22) Filed: Jun. 28, 2014

(65) Prior Publication Data
US 2015/0009141 A1   Jan. 8, 2015

(30) Foreign Application Priority Data

Jul. 5, 2013   (TW) .............................. 102124212 A

(51) Int. Cl.
| | |
|---|---|
| *G09G 5/00* | (2006.01) |
| *G06F 3/0346* | (2013.01) |
| *G06F 3/03* | (2006.01) |
| *G06F 3/038* | (2013.01) |
| *G06F 3/0481* | (2013.01) |

(52) U.S. Cl.
CPC .............. *G06F 3/0346* (2013.01); *G06F 3/038* (2013.01); *G06F 3/0325* (2013.01); *G06F 3/04812* (2013.01); *G06F 2203/0384* (2013.01)

(58) Field of Classification Search
CPC ..... G06F 3/0325; G06F 3/0346; G06F 3/038; G06F 3/04812; G06F 2203/0384; G06F 3/011; G06F 3/016; G06F 3/017; G06F 3/0338; G06F 3/0485; G06F 21/36; G06F 21/31; G06F 21/00; G06F 3/031; G06F 1/1626

USPC .................................................... 345/168–180
See application file for complete search history.

(56) References Cited

U.S. PATENT DOCUMENTS

| | | | |
|---|---|---|---|
| 6,411,278 B1 | 6/2002 | Kage et al. | |
| 2008/0012824 A1 | 1/2008 | Grunnet-Jepsen | |
| 2008/0278445 A1* | 11/2008 | Sweetser ............... | G06F 3/0346 345/158 |
| 2013/0335323 A1* | 12/2013 | Huang .................... | G06F 3/038 345/158 |
| 2014/0181669 A1* | 6/2014 | Tung ...................... | G06F 3/0346 715/720 |

FOREIGN PATENT DOCUMENTS

TW   I357063   1/2012

* cited by examiner

*Primary Examiner* — Kent Chang
*Assistant Examiner* — Nelson Rosario
(74) *Attorney, Agent, or Firm* — Li & Cai Intellectual Property (USA) Office

(57) ABSTRACT

A pointer positioning method of a handheld pointer device, which includes capturing a first image frame containing a reference point to compute a first pointing coordinate according to the image position of the reference point in the first image frame; generating a cursor parameter of a cursor according to the first pointing coordinate; when the handheld pointer device enters a pointer-lock mode, records the first pointing coordinate and positions the cursor at the first pointing coordinate on a display apparatus; when the handheld pointer device exits the pointer-lock mode, captures a second image frame to compute a second pointing coordinate according to the image position of the reference point in the second image frame to obtain a displacement vector between the first and the second pointing coordinates; generating the cursor parameter and controlling the movement of the cursor according to the displacement vector and the first pointing coordinate.

31 Claims, 23 Drawing Sheets

POINTER POSITIONING METHOD OF HANDHELD POINTER DEVICE

BACKGROUND

1. Technical Field

The present disclosure relates to a positioning method of a pointer device, in particular, to a pointer positioning method of a handheld pointer device.

2. Description of Related Art

Handheld remote control devices are operable to compute a pointing coordinate relative to a display apparatus through analyzing the position of a reference light source formed in an image sensing area of a built-in image sensor, wherein the reference light mark is located near the display apparatus. Handheld remote control devices further transmit pointing coordinate data computed to a host computer for the host computer to correspondingly control the movement of an object (e.g., a cursor) displayed on the screen of the display apparatus in coordination with the execution of elated software application.

Whenever a user operates a handheld remote control device, the user generally holds the handheld remote control device in the air and controls the position of the cursor displayed on the screen of the display apparatus for performing software related operations. However, it is inevitable that the handheld remote control device might falsely move due to hand shaking or trembling causing the display position of the cursor displayed on the display apparatus to be unstable, thereby negatively affecting user operation with the handheld remote control device.

Although, the handheld remote control device generally has the capability of locking the pointing position and operatively fixedly position the cursor at the current display position on the display apparatus by detecting whether the user intend to stabilize or lock the cursor or whether a button for locking the cursor has been pressed. However, when the user release the handheld remote control device from the pointer-lock mode, the handheld remote control device would instantly computes the pointing position using the absolute positioning technique and controls the movement of the cursor straightly based on the image position of the reference light source formed in the image sensing area currently computed. As a result, cursor displayed on the display apparatus would suddenly jump from one place to another and reduce user's operation with the handheld remote control device, at same time causes operation inconvenience.

SUMMARY

Accordingly, an exemplary embodiment of the present disclosure provide a pointer positioning method for a handheld pointer device, and the pointer positioning method is operable to automatically switch between an absolute positioning mode and a relative positioning mode in computing the cursor position after the handheld pointer device has exited from the pointer-lock mode, thereby effectively prevent the occurrence of having the cursor suddenly jumps from one place to another and improve the user's operation with the handheld remote control device.

An exemplary embodiment of the present disclosure provides a pointer positioning method of a handheld pointer device, and the pointer position method includes the following steps. A first image frame containing a reference point is first captured for computing a first pointing coordinate according to the image position of the reference point formed in the first image frame. Then, a cursor parameter is generated for controlling a display position of a cursor on a display apparatus according to the first pointing coordinate. When the handheld pointer device enters a pointer-lock mode, the handheld pointer device records the first pointing coordinate and fixedly positions the display position of the cursor at the first pointing coordinate on the display apparatus by continuously outputting the cursor parameter corresponds to the first pointing coordinate to the display apparatus or by not outputting the cursor parameter to the display apparatus. When the handheld pointer device exits the pointer-lock mode, the handheld pointer device captures a second image frame and computes a second pointing coordinate according to the image position of the reference point formed in the second image frame and generates a displacement vector between the first pointing coordinate and the second pointing coordinate. Afterwards, a cursor position according to the displacement vector and the first pointing coordinate is computed for compensating an offset between the first pointing coordinate and the second pointing coordinate. The cursor parameter for controlling the movement of the cursor is subsequently generated based on the computational result.

Another exemplary embodiment of the present disclosure provides a pointer positioning method of a handheld pointer device, and the pointer position method includes the following steps. A first image frame containing a reference point is first captured to compute a first pointing coordinate according to the image position of the reference point formed in the first image frame. Then, a cursor parameter is generated for controlling a display position of a cursor on a display apparatus according to the first pointing coordinate. When the handheld pointer device enters a pointer-lock mode, the handheld pointer device records the first pointing coordinate and positions the display position of the cursor at the first pointing coordinate on the display apparatus by continuously outputting the cursor parameter corresponds to the first pointing coordinate to the display apparatus or by not outputting the cursor parameter to the display apparatus. When the handheld pointer device exits the pointer-lock mode, causes the handheld pointer device to compute a cursor position of the cursor in the subsequent movement by using the first pointing coordinate as a starting point along with a pointing coordinate displacement vector generated based on the movement of the handheld pointer device. Next, the cursor parameter for controlling the movement of the cursor is correspondingly generated based on the computational results.

Another exemplary embodiment of the present disclosure provides a pointer positioning method of a handheld pointer device, and the pointer position method includes the following steps. At a first time interval, a first pointing coordinate is generated and a display position of a cursor is fixedly positioned at the first pointing coordinate. At a second time interval, a second pointing coordinate is generated, wherein the second time interval occurs after the first time interval. Then, a first displacement vector between the first pointing coordinate and the second pointing coordinate is computed. Next, a compensating vector per unit displacement is generated according to the first displacement vector. At a third time interval, a third pointing coordinate is generated, wherein the third time interval occurs after the second time interval. Next, a second displacement vector between the third pointing coordinate and the second pointing coordinate is computed subsequently. Subsequently, the cursor position of the cursor at the third time interval is computed according to the first pointing coordinate, the compensating vector per unit displacement and the second displacement vector.

Another exemplary embodiment of the present disclosure provides a pointer positioning method of a handheld pointer device, and the pointer position method includes the following steps. At a first time interval, a first pointing coordinate is generated to cause the handheld pointer device to enter a pointer-lock mode and fixedly positioning a display position of a cursor at the first pointing coordinate. At a second time interval, a second pointing coordinate is generated to cause the handheld pointer device to exit the pointer-lock mode, wherein the second time interval occurs after the first time interval. Then, a first displacement vector between the first pointing coordinate and the second pointing coordinate is computed. A compensating vector per unit displacement is subsequently generated according to the first displacement vector. Then, the handheld pointer device is driven to compute the cursor position of the cursor in the subsequent movement of the handheld pointer device after the second time interval by using the first pointing coordinate as a starting point along with the compensating vector per unit displacement and a pointing coordinate displacement vector generated based on the movement of the handheld pointer device.

To sum up, an exemplary embodiment of the present disclosure provide a pointer positioning method of a handheld pointer device, which can actively compute the movement of the handheld pointer device by detecting the image position of at least a reference point in image frames captured and determine whether to cause the handheld pointer device to enter or to exit from the pointer-lock mode. The pointer positioning method can automatically cause the handheld pointer device to correct the pointing coordinate associated with the image position of the reference point in the image frame and compute the position of a cursor in a relative positioning mode. Moreover, the handheld pointer device automatically computes the position of cursor in an absolute positioning mode after complete a pointing coordinate calibrating program, so as to prevent the occurrence of the cursor suddenly jump from one place to another. Thereby, enhance the stability of the handheld pointer device and at the same time, the operation convenience and of the user.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 10-1 and FIG. 10-2 are flowchart diagrams illustrating a boundary calibration method of a handheld pointer device provided in accordance to an exemplary embodiment of the present disclosure.

DESCRIPTION OF THE EXEMPLARY EMBODIMENTS

Figure 1:
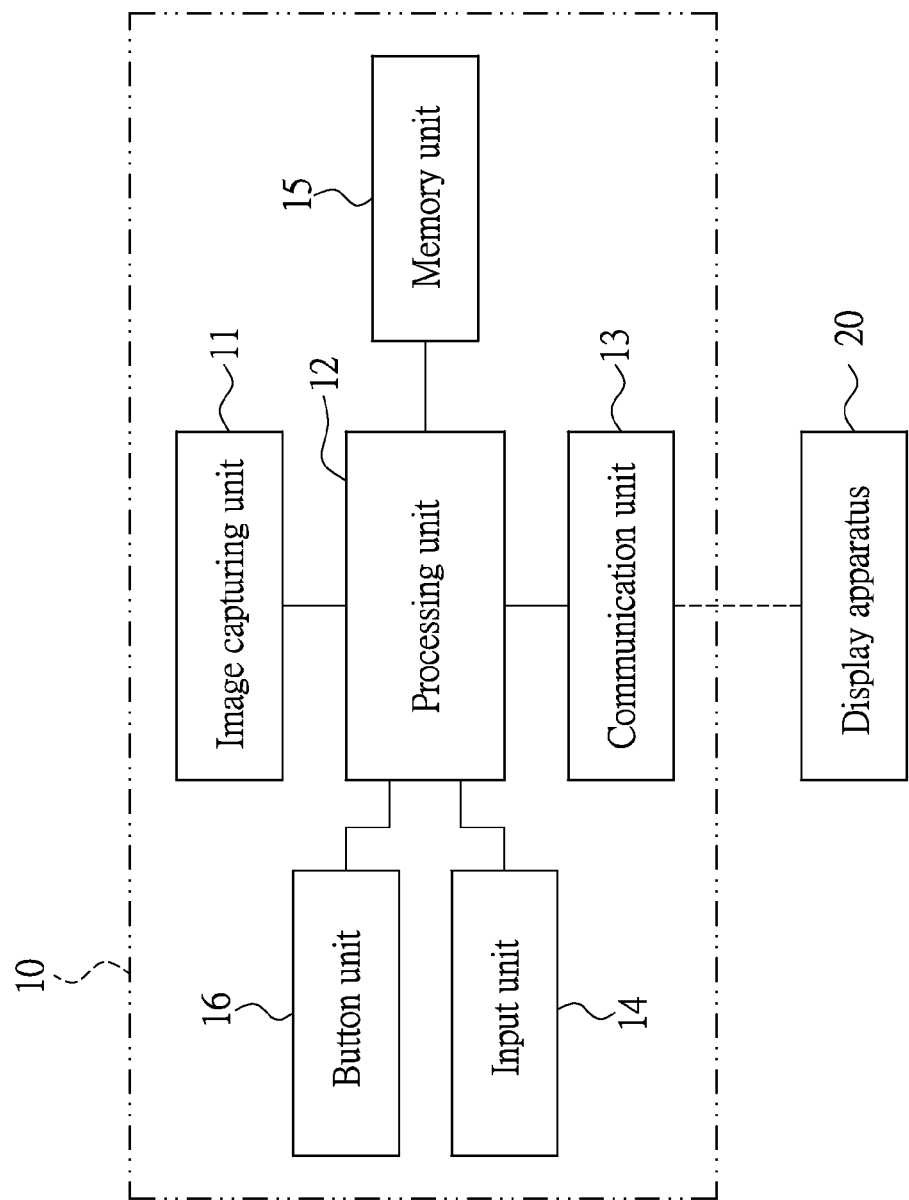
FIG. 1 is a diagram of a handheld pointer device provided in accordance to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

(An Exemplary Embodiment of a Handheld Pointer Device)

A handheld pointer device can be adapted for positioning a pointer on a display apparatus (not shown). Please refer to FIG. 1, which shows a diagram illustrating a handheld pointer device. The handheld pointer device 10 is operable to capture an image containing at least a reference point (not shown) and compute a pointing coordinate of the handheld pointer device 10 according to the image position of the at least a reference point. The handheld pointer device 10 can operatively compute a relative movement information thereof with respect to the reference point according to the movement of the pointing coordinate computed in consecutive time intervals. The handheld pointer device 10 further wirelessly transmits the positioning data corresponding to the pointing coordinate or related movement information to a display apparatus 20 for coordinating with the execution of a software application on the display apparatus 20.

The pointing coordinate herein is a pointer position of a pointer generated as the handheld pointer device 10 pointing toward the display apparatus 20 in a coordinate system defined by the display apparatus 20. In general, the pointer is an optical axis of the handheld pointer device 10 aiming at the location of the display apparatus 20, or a center point of an image frame captured by an image capturing unit of the handheld pointer device 10, wherein the center point of the image frame corresponds to the location of the display apparatus 20. Computing the pointing coordinate of the handheld pointer device 10 based on the image position of the reference point in the image frames captured by the handheld pointer device 10 and the relative positions between the reference point and the display apparatus 20 are known arts in the field, hence further descriptions are hereby omitted.

Briefly, when the handheld pointer device 10 operates in an absolute positioning mode, the handheld pointer device 10 operatively captures a first image frame corresponding to the position of a reference point and computes a first pointing coordinate of the handheld pointer device relative to the display apparatus 20 according to the image position of the reference point in the first image frame. The handheld pointer device 10 operatively generates a cursor parameter for controlling the cursor position displayed on the display apparatus 20 according to the first pointing coordinate. When the handheld pointer device 10 enters a pointer-lock mode, the handheld pointer device 10 operatively records the first pointing coordinate and fixedly positions the cursor (not shown) at a display position on the display apparatus 20 associated with the first pointing coordinate, which is generated before the handheld pointer device 10 enters the pointer-lock mode.

In the instant embodiment, the handheld pointer device 10 enters a relative positioning mode upon exiting the pointer-lock mode. To put it concretely, when the handheld pointer device 10 enters the relative positioning mode, the handheld pointer device 10 captures a second image frame containing the reference point and computes a second pointing coordinate of the handheld pointer device 10 relative to the display apparatus 20 according to the image position of the reference pointer formed in the second image frame. The handheld pointer device 10 computes a displacement vector of the reference point according to the first pointing coordinate recorded before the handheld pointer device 10 enters the pointer-lock mode and the second pointing coordinate computed. Thereafter, the handheld pointer device 10 computes the cursor position according to the displacement vector computed and the first pointing coordinate recorded for compensating an offset between the first pointing coordinate recorded before the handheld pointer device 10 enters the pointer-lock mode and the second pointing coordinate. The handheld pointer device 10 further generates a cursor parameter for controlling the movement of the cursor based on the computational result.

More specifically, the handheld pointer device 10 is operable to execute and complete the cursor position calibration within a preset calibration time or a preset number of calibrations for causing the cursor to smoothly move or translate from the cursor position that corresponds to the first pointing coordinate to the cursor position that corresponds to the pointing coordinate currently compute. When the handheld pointer device 10 completes the cursor position calibration, the handheld pointer device 10 automatically exits the relative positioning mode and enters the absolute positioning mode until the next time that the handheld pointer device 10 is driven to enter the pointer-lock mode.

In short, the handheld pointer device 10 of the instant embodiment can automatically operates in the absolute positioning mode, the relative positioning mode, or the pointer-lock mode and computes the position of the cursor on the display apparatus 20 based on the operation mode of the handheld pointer device 10.

The handheld pointer device 10 includes an image capturing unit 11, a processing unit 12, a communication unit 13, an input unit 14, a memory unit 15, and a button unit 16. The image capturing unit 11, the communication unit 13, the input unit 14, the memory unit 15, and the button unit 16 are coupled to the processing unit 12, respectively.

The image capturing unit 11 is configured to capture the image containing the reference point as the handheld pointer device 10 pointing toward the reference point and to sequentially generate a plurality of image frames. The reference point can be placed near the display apparatus 20. The reference point is provided to the handheld pointer device 10 for determining the pointing position of the handheld pointer device 10, i.e., determines the moving direction and the displacement of the handheld pointer device 10 relative to the reference point.

To put it concretely, the image capturing unit 11 can utilize an optical filter to filter any light rays outside the spectrum of the specific light generated by the reference point (e.g., IR light sources), such that only the light generated and emitted by the reference point appears on the images captured by the image capturing unit 11. The image capturing unit 11 further detects light rays generated and emitted by the reference point according to a predetermined frame capturing rate and sequentially generate a plurality of image frames containing the reference point.

The processing unit 12 is configured to receive the image frames outputted by the image capturing unit 11 and to compute the image position of the reference point formed in one of the image frames according to respective image frame among the image frames captured. The processing unit 12 operatively computes the cursor position to correspondingly control the display position of the cursor on the display apparatus 20 based on the operation mode (e.g., the absolute positioning mode, the relative positioning mode, or the pointer-lock mode) of the handheld pointer device 10.

The input unit 14 is configured for a user of the handheld pointer device 10 to configure the predetermined frame capturing rate and the calibration parameters for computing the cursor position in the relative positioning mode, such as the number of calibrations associated with the cursor position. For instance, the user of the handheld pointer device 10 may configure the predetermined frame capturing rate according to a preset calibration time and configure the number of calibrations according to the predetermined frame capturing rate. For another instance, the user may also determine the number of calibrations based on the predetermined frame capturing rate configured. The predetermined frame capturing rate can be configured in corresponding to the frame refresh rate of the display apparatus 20. In other words, the predetermined frame capturing rate can be configured according to the display operation of the display apparatus 20.

In practice, the input unit 14 can be implemented by a keypad interface, an optical finger navigation component, or a button and the present disclosure is not limited thereto. The input unit 14 can be configured to cause the display apparatus 20 to display a configuration or setting interface provided for the user to configure the calibration time, frame capturing rate and/or the number of calibrations for calibrating the cursor. In another embodiment, where the handheld pointer device 10 has a display screen (not shown), which can be configured to show the calibration time, the frame capturing rate and/or number of calibrations for calibrating the cursor. The display screen of the handheld pointer device 10 can be a touch screen.

The memory unit 15 can be configured to store the first pointing coordinate, the second pointing coordinate, the displacement vector, and the cursor parameter. The memory unit 15 can also be configured to store the calibration time, the predetermined frame capturing rate, and the number of calibrations for the cursor calibration according to the operation requirement of the handheld pointer device 10.

The button unit 16 is configured for the user to selectively press and cause the handheld pointer device 10 to enter or to exit from the pointer-lock mode. That is, the user of the handheld pointer device 10 can cause the handheld pointer device 10 to enter or to exit from the pointer-lock mode through pressing or releasing operations the button unit 16 of the handheld pointer device 10.

It is worth to note that if the user causes the handheld pointer device 10 to enter the pointer-lock mode by pressing the button unit 16, then the handheld pointer device 10 can be configured such that the handheld pointer device 10 does not automatically exit the pointer-lock mode upon detected that the displacement of the pointing coordinate generated responsive to the movement of the handheld pointer device 10 is greater than a threshold. That is, the handheld pointer device 10 can be configured to continuously operate in the pointer-lock mode until the user manually releases the handheld pointer device 10 from the pointer-lock mode with the button unit 16 (i.e. the user manually controls the handheld pointer device 10 to exit the pointer-lock mode).

In practice, the button unit 16 can be installed on the handheld pointer device 10 and can be implemented by one of a touch switch, a tact switch, or a toggle switch. For instance, when the button unit 16 is implemented by a touch switch, the handheld pointer device 10 can be configured such that the user may through one-click operation to activate the pointer-lock mode and double-click operation to cause the handheld pointer device 10 to exit from the pointer-lock mode.

When the processing unit 12 drives the handheld pointer device 10 to operate in the absolute positioning mode, the processing unit 12 computes the image position of the reference point formed in the first image frame among the image frames captured. The handheld pointer device 10 computes and generates the first pointing coordinate according to the image position of reference point formed in the first image frame. The processing unit 12 subsequently computes the cursor position of the cursor in absolute positioning mode. Particularly, the processing unit 12 computes the cursor parameter for controlling the display position of the cursor on the display apparatus 20 according to the first pointing coordinate. The processing unit 12 further operatively drives the communication unit 13 to wirelessly transmit the cursor parameter to the display apparatus 20 to correspondingly control the movement of the cursor on the display apparatus. Computing the absolute pointing coordinate of the handheld pointer device 10 relative to the display apparatus 20 according to the image position of one or more reference point formed in frames captured is known technique in the art and is not the main focus of the present disclosure, and further descriptions are hereby omitted.

When the handheld pointer device 10 enters the pointer-lock mode, the processing unit 12 instantly records the first pointing coordinate lastly computed before entering the pointer-lock mode and fixes the display position of the cursor shown on the display apparatus 20. For instance, the processing 12 can cause the communication unit 13 to continuously output the cursor parameter that corresponds to the first pointing coordinate record so as to fix the display position of the cursor shown on the display apparatus 20. Or, the processing unit 12 can stop outputting the cursor parameter or outputting zero relative displacement data so as to fix the display position of the cursor shown on the display apparatus 20.

When the handheld pointer device 10 exits from the pointer-lock mode and enters the relative position mode. The processing unit 12 operatively initiates a pointing coordinate calibration program to cause the handheld pointer device 10 to compute the cursor position in a relative positioning mode. Under the relative positioning mode, the processing unit 12 computes the cursor position of the cursor in the subsequent movement by using the first pointing coordinate as a starting point along with a pointing coordinate displacement vector within the number of calibrations configured or during the calibration time. The pointing coordinate displacement vector is the displacement computed between two pointing coordinates computed in consecutive intervals.

In the instant embodiment, the image capturing unit 11 can be implemented by a charge-coupled device (CCD) image sensor or a complementary metal oxide semiconductor (CMOS) image sensor depend upon the practical operational requirement of the handheld pointer device 10 and the present disclosure is not limited thereto.

The processing unit 12 can be implemented by a processing chip such as a microcontroller or an embedded controller programmed with necessary firmware, however the present disclosure is not limited to the example provided herein. The memory unit 15 can be implemented by a volatile memory chip or a nonvolatile memory chip including but not limited to a flash memory chip, a read-only memory chip, or a random access memory chip. The communication unit 13 may transmit the relative movement information to the display apparatus 20 using Bluetooth radio technology, and the instant embodiment is not limited thereto.

It shall be note that the exact type, exact structure and/or implementation method associated with the image capturing unit 11, the processing unit 12, the communication unit 13, the input unit 14, the memory unit 15, and the button unit 16 may depend upon the practical structure and the implementation method adopted for the handheld pointer device 10 and the present disclosure is not limited to the example provided in the instant embodiment.

For further understanding over the operation of the handheld pointer device 10, the subsequent paragraphs describe an operation of the handheld pointer device 10. Please refer to FIG. 2 in conjunction with FIG. 1. FIG. 2 shows an operational diagram of a handheld pointer device in an interactive system provided in accordance to an exemplary embodiment of the present disclosure.

The processing unit 12 of the handheld pointer device 10 operatively cause the image capturing unit 11 to capture a plurality of image frames as the handheld pointer device 10 pointing toward the reference point 21. The processing unit 12 computes the image position of the reference point 21 formed in one of the plurality of image frames captured so as to compute the pointing coordinate of the handheld pointer device 10 relative to the display apparatus 20. The processing unit 12 computes the cursor position of the cursor 23 on the screen shown by the display apparatus 20. The handheld pointer device 10 correspondingly generates the cursor parameter for controlling the movement of the cursor 23 according to the movement of the reference point detected and drives the communication unit 13 to wireless transmit the cursor parameter to the display apparatus 20. Accordingly, the handheld pointer device 10 controls the display position of the cursor 23 on the screen shown by the display apparatus 20.

Incidentally, the display apparatus 20 may have the necessary software and hardware architecture for executing the display related software application. In practice, depending upon the practical operational requirements of the interactive system, the interactive system may further comprise a host computer (not shown) such as video game console or a computer. The host computer can be configured to operatively process the program codes associated with a software application (e.g., video games such as light gun games, baseball games, tennis games and the like) and execute the software application. The host computer further can display the execution process of the software application on the display apparatus 20 for the user to view and perform the correspondingly control operations.

It is worth to note that the handheld pointer device 10 of the present disclosure can be a remote controller or video game controller. The display apparatus 20 can be for example a projection display apparatus, a display of a video game machine or a monitor of a computer. The reference point 21 can be implemented by a light source which comprises of a plurality of light emitting diodes having specific wavelength (such as infrared light emitting diodes (IR LEDs), laser diodes (LDs), ultra-violet light emitting diodes (UV LEDs) or like) arranged in an array of a regular or irregular shape. Moreover, the light emitting diodes of the reference point 21 can be electrically connected to the display apparatus 20 or the host computer to receive power therefrom or powered by an independent power source connected thereto for support the lighting operation.

Additionally, the instant embodiment uses only one reference point as reference for computing the relative displacement between the handheld pointer device 10 and the display apparatus 20, however those skilled in the art shall be able to configure the number of the reference point 21 to be one or more according to the practical operation needs. In other words, FIG. 2 is merely served to illustrate an operation of the handheld pointer device 10, and the present disclosure is not limited thereto.

Figure 3:
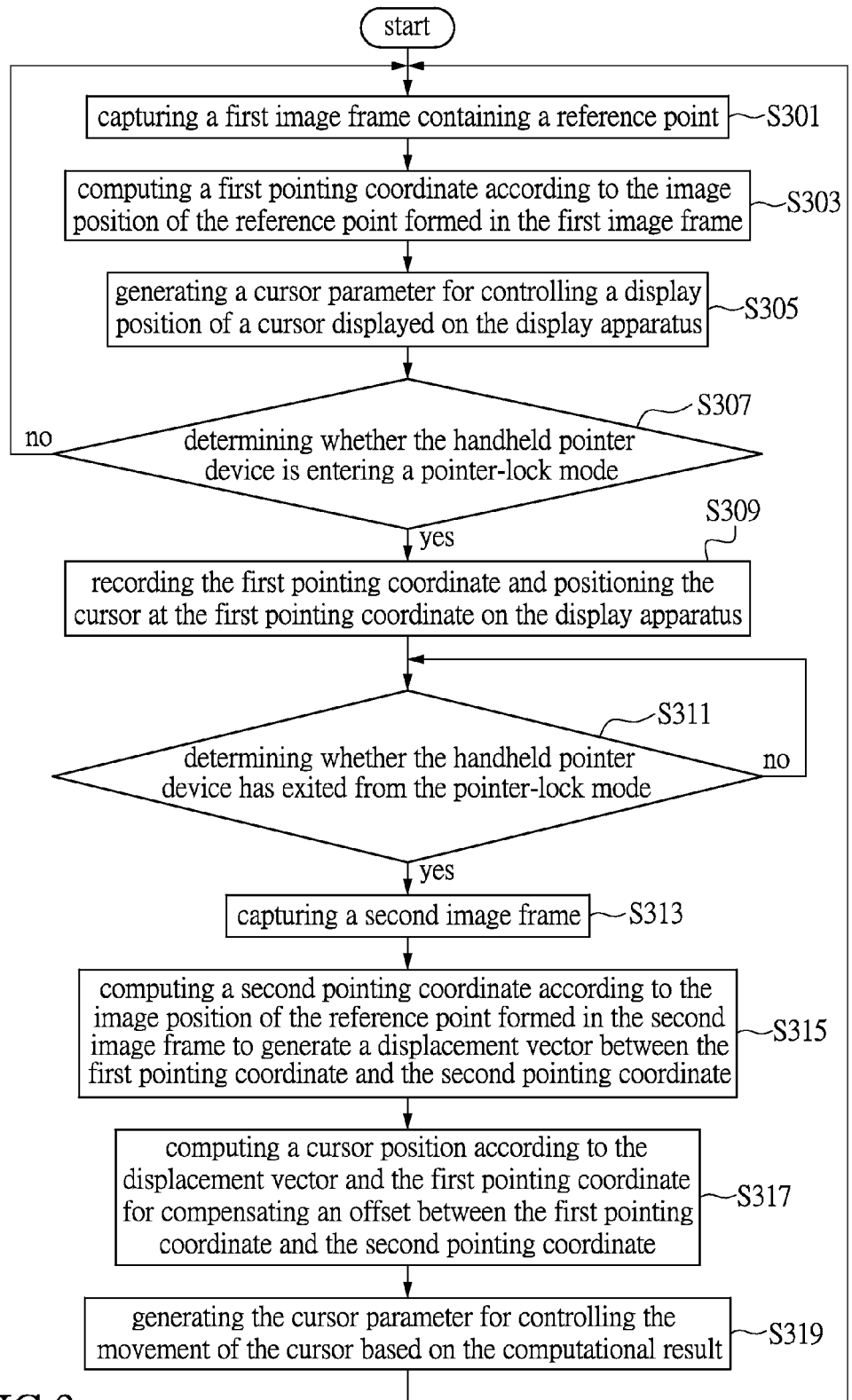
FIG. 3 is a flowchart diagram illustrating a pointer positioning method provided in accordance to an exemplary embodiment of the present disclosure.
Figure 4A:
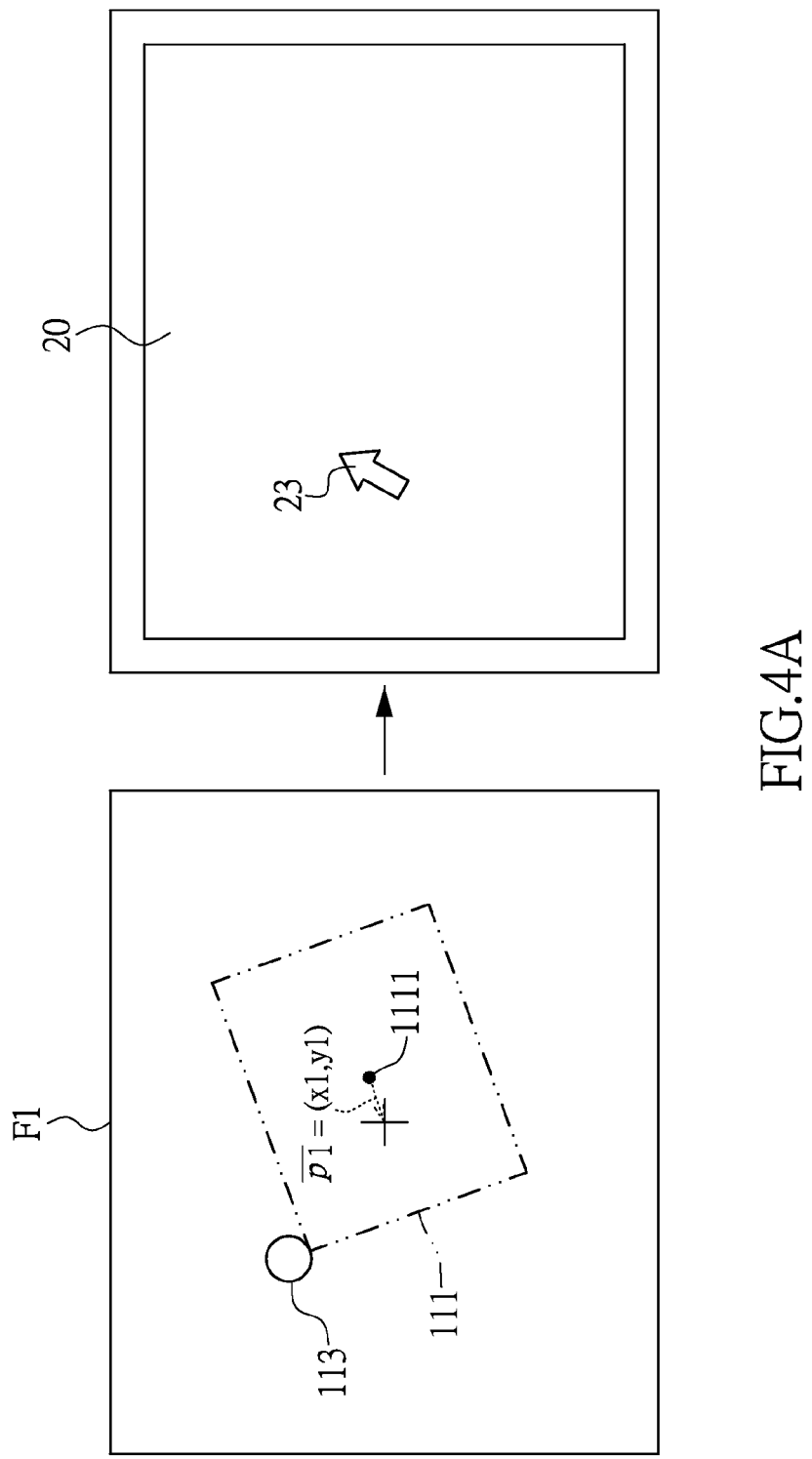
FIG. 4A~4C are diagrams respectively illustrating the movement of the reference point detected as the handheld pointer device moves and the correspondingly movement of the cursor displayed on a display apparatus provided in accordance to an exemplary embodiment of the present disclosure.
Figure 4B:
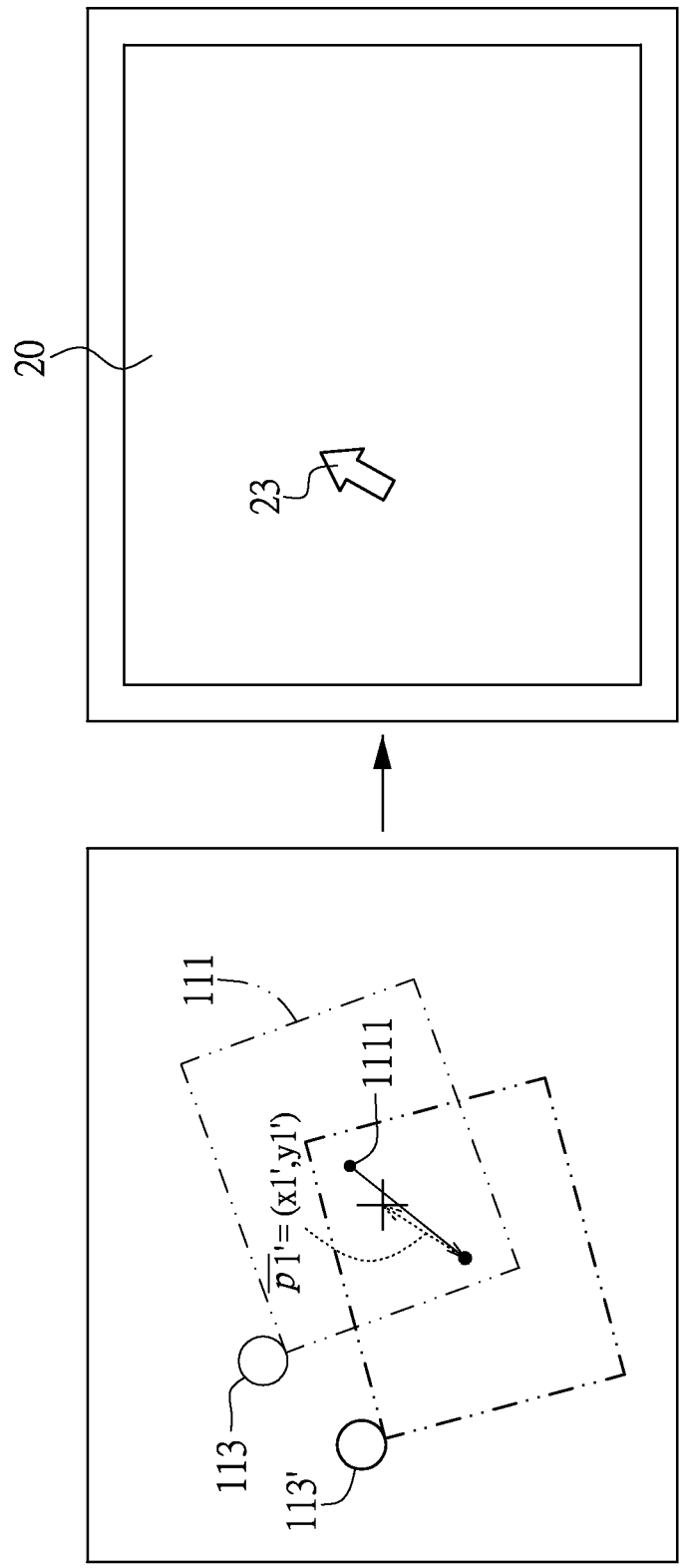
Figure 4C:
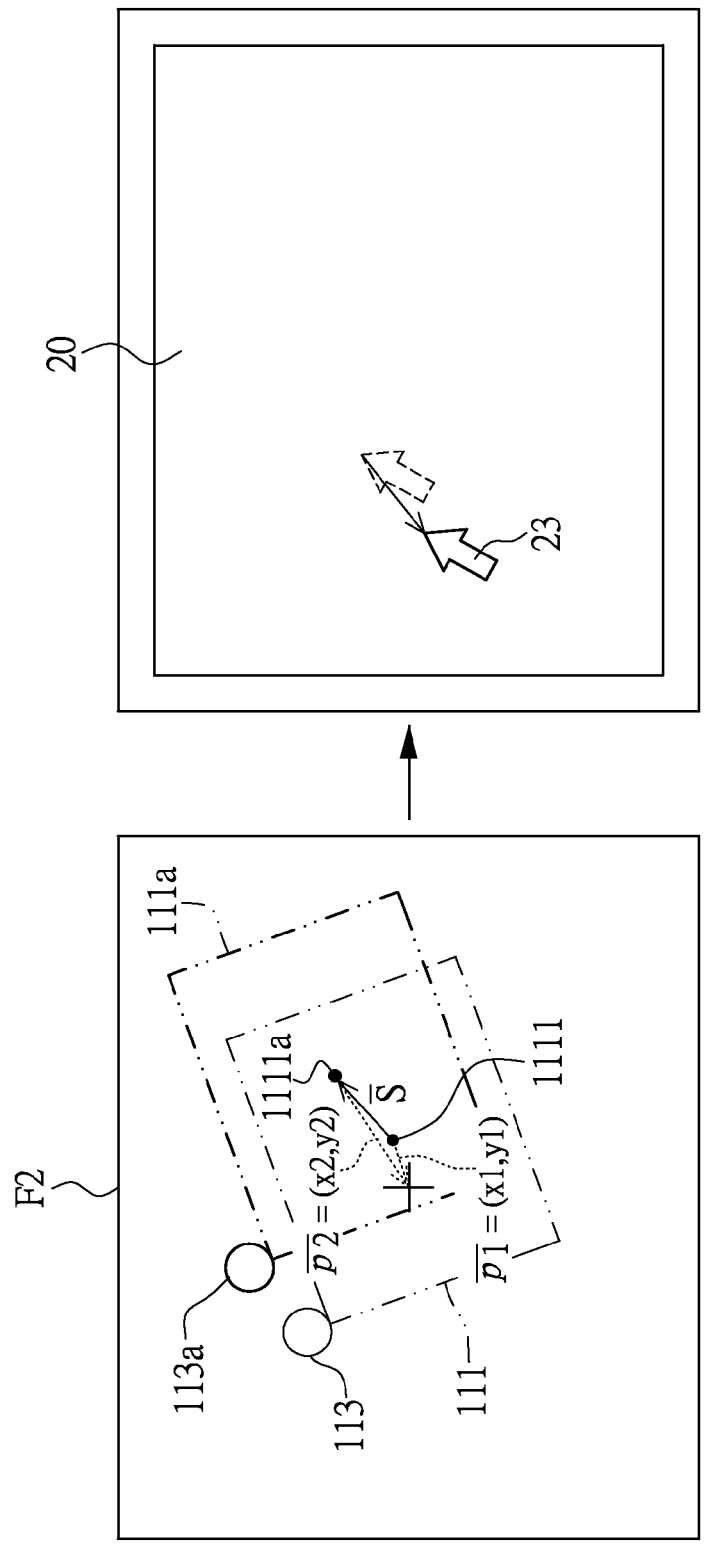

The instant embodiment further provides a pointer positioning method for the handheld pointer device 10. Please refer to FIG. 3 in conjunction with FIGS. 1, 2, and FIG. 4A~FIG. 4C. FIG. 3 shows a flowchart diagram illustrating a pointer positioning method provided in accordance to an exemplary embodiment of the present disclosure. FIG. 4A~4C show diagrams respectively illustrating the movement of the reference point detected as the handheld pointer device moves and the correspondingly movement of the cursor displayed on a display apparatus provided in accordance to an exemplary embodiment of the present disclosure.

Initially, in Step S301, the image capturing unit 11 is driven to capture an image containing the reference point 21 as the handheld pointer device 10 pointing toward the position of the reference point 21 and generate a first image frame F1.

In Step S303, the processing unit 12 generates a first pointing coordinate $\overline{p_1}$ of the handheld pointer device 10 relative to the display apparatus 20 based on the image position of a reference point image 113 formed in the first image frame F1, wherein the reference point image 113 corresponds to the reference point 21. The first pointing coordinate $\overline{p_1}$ represents the pointing vector of the handheld pointer device 10 relative to the display apparatus 20 in the first image frame F1. The first pointing coordinate $\overline{p_1}$ herein is represented by (x1, y1).

The computation of first pointing coordinate $\overline{p_1}$ is described as follow. The processing unit 12 first defines an operating area 111 on the first image frame F1 that corresponds to the display apparatus 20 according to the center point "+" of the first image frames F1 and the image position of the reference point image 113 formed in the first image frames F1. The operating area 111 corresponds to the screen of the display apparatus 20 and is scaled with a predetermined display ratio. The operating area 111 is defined in the first image frame F1 by using the image position of the reference point image 113 as the origin and scaled with the predetermined display ratio. The processing unit 12 can further define the center 1111 of the operating area 111 in the first image frame F1. Such that, the processing unit 12 can use the center 1111 of the operating area 111 as the origin and the present rotation angle of the handheld pointer device 10 to compute the pointing vector of the center point "+" of the first image frame F1 in the operating area 111 so as to obtain the first pointing coordinate $\overline{p_1}$.

It is worth to note that it is not necessary to define the center 1111 of the operating area 111 to obtain the first pointing coordinate $\overline{p_1}$, the processing unit 12 can also obtain the first pointing coordinate $\overline{p_1}$ by computing the rotation angle of the handheld pointer device 10, wherein the rotation angle of the handheld pointer device 10 is computed directly according to relative position between the center point "+" of the first image frames F1 and the image position of the reference point image 113 formed in the first image frames F1 or the image forming feature of the reference point image 113.

The center point "+" in the instant embodiment represents the center of the image sensing array of the image capturing unit 11. Alternatively, the first pointing coordinate $\overline{p_1}$ represents the pointing vector of the center of the image sensing array of the image capturing unit 11 (i.e., the center point "+") positioned in the first image frame F1 with respect to the coordinate system of the display apparatus 20 defined therein. The rotation angle can be generated and outputted by an accelerometer unit (not shown) built-in in the handheld pointer device 10. The accelerometer unit can be a G-sensor or an accelerometer, and the present disclosure is not limited thereto.

In Step S305, the processing unit 12 computes the cursor position of the cursor 23 according to the first pointing coordinate $\overline{p_1}$ in the absolute positioning mode. Subsequently, the processing unit 12 generates a cursor parameter for controlling the display position of the cursor 23 on the display apparatus 20 according to the computation result.

It worth to note that as shown in FIG. 4A, as the first pointing coordinate $\overline{p_1}$ is located within the operating area 111 of the first image frame F1, and the display apparatus 20 correspondingly displays the cursor 23 on the display area of the screen shown thereon according to a display aspect ratio configured for the display apparatus 20 upon receiving the cursor parameter. Specifically, when the handheld pointer device 10 transmits the cursor parameter for controlling the movement operation of the cursor and the predetermined display ratio to the display apparatus 20, the display apparatus 20 operatively computes the cursor position of the cursor and correspondingly positions the cursor 23 on the screen shown by the display apparatus 20 according to the current display aspect ratio (i.e., the resolution of the display apparatus).

Those skilled in the art shall be able to infer the method of computing the display position of the cursor displayed on the screen shown by the display apparatus 20 according to the current display aspect ratio and the cursor parameter, hence further descriptions are hereby omitted.

In Step S307, the processing unit 12 determines whether to the handheld pointer device 10 is entering the pointer-lock mode. The processing unit 12 can determine whether the handheld pointer device 10 enters the pointer-lock mode based on the displacement of the pointing coordinate associated with the reference point image over consecutive image frames or whether the button unit 16 has been pressed.

When the processing unit 12 determines that the handheld pointer device 10 enters the pointer-lock mode, the processing unit 12 executes Step 309; otherwise, the processing unit 12 returns to Step S301 and continues to cause the handheld pointer device 10 to operate in the absolute positioning mode.

In Step S309, the processing unit 12 records the first pointing coordinate $\overline{p_1}$ in the memory unit 15. At the same time, the processing unit 12 drives the communication unit 13 to continuously output the cursor parameter that corresponds to the first pointing coordinate $\overline{p_1}$, or to stop outputting any cursor parameter or output a (0, 0) displacement parameter for the cursor 23 to the display apparatus 20, so as to fix the display position of the cursor 23 shown on the screen of the display apparatus 20. At this time, even if the user operates the handheld pointer device 10 resulting in a movement of the reference point image 113 that corresponds to the reference point 21 and causes the first pointing coordinate $\overline{p_1}$ to move to $\overline{p_1'}$ as shown in FIG. 4B, so long as the handheld pointer device 10 operates in the pointer-lock mode, the handheld pointer device 10 would continuously fix the display position of the cursor 23 displayed on the display apparatus 20. The processing unit 12 computes the pointing coordinate $\overline{p_1'}$ by setting the center 1111' of the operating area 111' as the origin and computing the pointing vector of the center point "+" of the first image frame F1 in the operating area 111'. The operating area 111' is defined according to the reference point image 113'.

In one embodiment, the processing unit 12 can also directly use the image position of the reference point image 1113' as the origin and computes the position vector (coordinate) of the center point "+" of the first image frame F1 in the operating area 111'. For computational convenience, each of the pointing coordinates $\overline{p_1}$ and $\overline{p_1'}$ shall be computed using same method e.g., all computed by setting the reference point image in the presently captured framed as the origin or all computed by setting the center of the operating area in the presently captured framed as the origin.

In Step S311, the processing unit 12 determines that the handheld pointer device 10 has exited from the pointer-lock mode based on the computation result of the displacement of the handheld pointer device 10 according to the image position of the reference point 21 computed for the consecutive image frames captured or the operational status of the button unit 16. When the processing unit 12 determines that the handheld pointer device 10 has exited from the pointer-lock mode, the processing unit 12 executes the Step S313; otherwise, the processing unit 12 returns to Steps S311.

In Step S313, the image capturing unit 11 of the handheld pointer device 10 is driven to capture another image frame containing the reference point 21 and generate a second image frame F2 as shown in FIG. 4C. The second image frame F2 is captured at a later time than the first image frame F1.

In Step S315, the processing unit 12 computes a second pointing coordinate $\overline{p2}$ according to the image position of the reference point image 113a that corresponds to the reference point 21 formed in the second image frame F2. As shown in FIG. 4C, the second pointing coordinate $\overline{p2}$ represents pointing vector computed by mapping the center of the image sensing array of the image capturing unit 11 (i.e., the center point "+") onto the operating area 111a which corresponds to the screen of the display apparatus 20 defined in the second image frame F2. The second pointing coordinate $\overline{p2}$ is represented by (x2, y2). The processing unit 12 uses the center 1111a of the operating area 111a as the origin and correspondingly computes the pointing vector of the center point "+" of the second image frame F2 in the operating area 111a so as to obtain the second pointing coordinate $\overline{p2}$. The operating area 111a is defined based on the reference point image 113a.

The processing unit 12 computes the displacement vector $\overline{S}$ between the first pointing coordinate $\overline{p_1'}$ and the second pointing coordinate $\overline{p1}$. The displacement vector $\overline{S}$ is the distance between the first pointing coordinate $\overline{p_1}$ and the second pointing coordinate $\overline{p2}$. That is, the displacement vector $\overline{S}$ represents the relative displacement of the handheld pointer device 10 with respective to the display apparatus between the first and the second image frames. The displacement vector $\overline{S}$ is computed by subtracting the first pointing coordinate $\overline{p_1}$ from the second pointing coordinate $\overline{p2}$.

In Step S317, the processing unit 12 computes the cursor position of the cursor 23 according to the displacement vector $\overline{S}$ and the first pointing coordinate $\overline{p_1}$ for compensating an offset between the first pointing coordinate $\overline{p_1}$ and the second pointing coordinate $\overline{p2}$.

The processing unit 12 further generates the cursor parameter for controlling the movement of the cursor 23 based on the computational result. Next, the processing unit 12 drives the communication unit 13 to wirelessly transmit the cursor parameter to the display apparatus 20 for controlling the movement of the cursor 23 displayed on the display apparatus 20.

It is worth to note that as shown in FIG. 4A~FIG. 4C, the reference point image 113, 113', and 113a in the instant disclosure are respectively represents by a circle, however the reference point image 113, 113', and 113a can also be represented by a cross-shaped or a star shaped symbol. The present disclosure is not limited to the example illustrated in FIG. 4A~FIG. 4C. Additionally, if the interactive system of FIG. 2 utilizes two or more reference point 21, then the image position of the reference point image 113 formed in the image frames can be configured to be the average-coordinate between/among the reference point images identified. Moreover, the processing unit 12 further can compensate the image position computation of the reference point image according to the preset image-forming parameters and preset image-forming distance so as to accurately determine the position of the reference point image.

For instance, the processing unit 12 can utilize the image parameter e.g., connecting the reference point image to the center point of the image frame to form a first angle and connecting the predefined reference point image line to the center point of the image frame to form a reference angle for computing the rotation angle of the handheld pointer device 10. The processing unit 12 further can compute the ratio between the reference point image to the preset image-forming distance for compensating the image positioning discrepancy as a result of different distance between the reference point 21 and the image capturing unit 11. Those skilled in the art shall be able to known the configuration of the preset image-forming parameters and the image forming distance as well as compensating the computation of the image position of the reference point image in the image frame using the preset image-forming parameters and the image forming distance, and further description is hereby omitted.

Next, computational details on the relative positioning mode are provided in the following paragraphs. Please refer to FIG. 5 in conjunction to FIG. 1, FIG. 2 and FIG. 6A~FIG.

Figure 5:
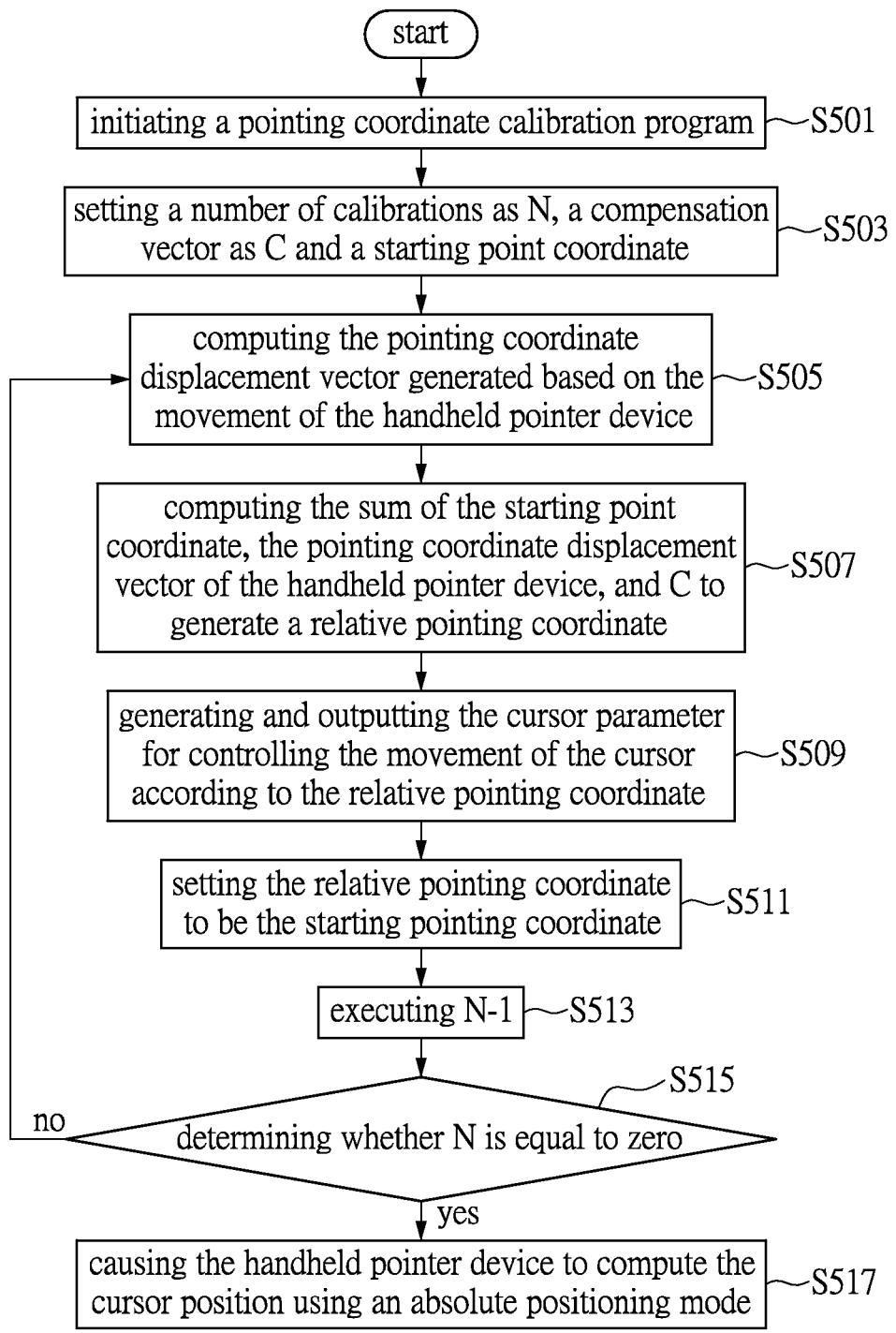
FIG. 5 is a flowchart diagram illustrating a method for positioning a cursor in a relative positioning mode provided in accordance to an exemplary embodiment of the present disclosure.
Figure 6A:
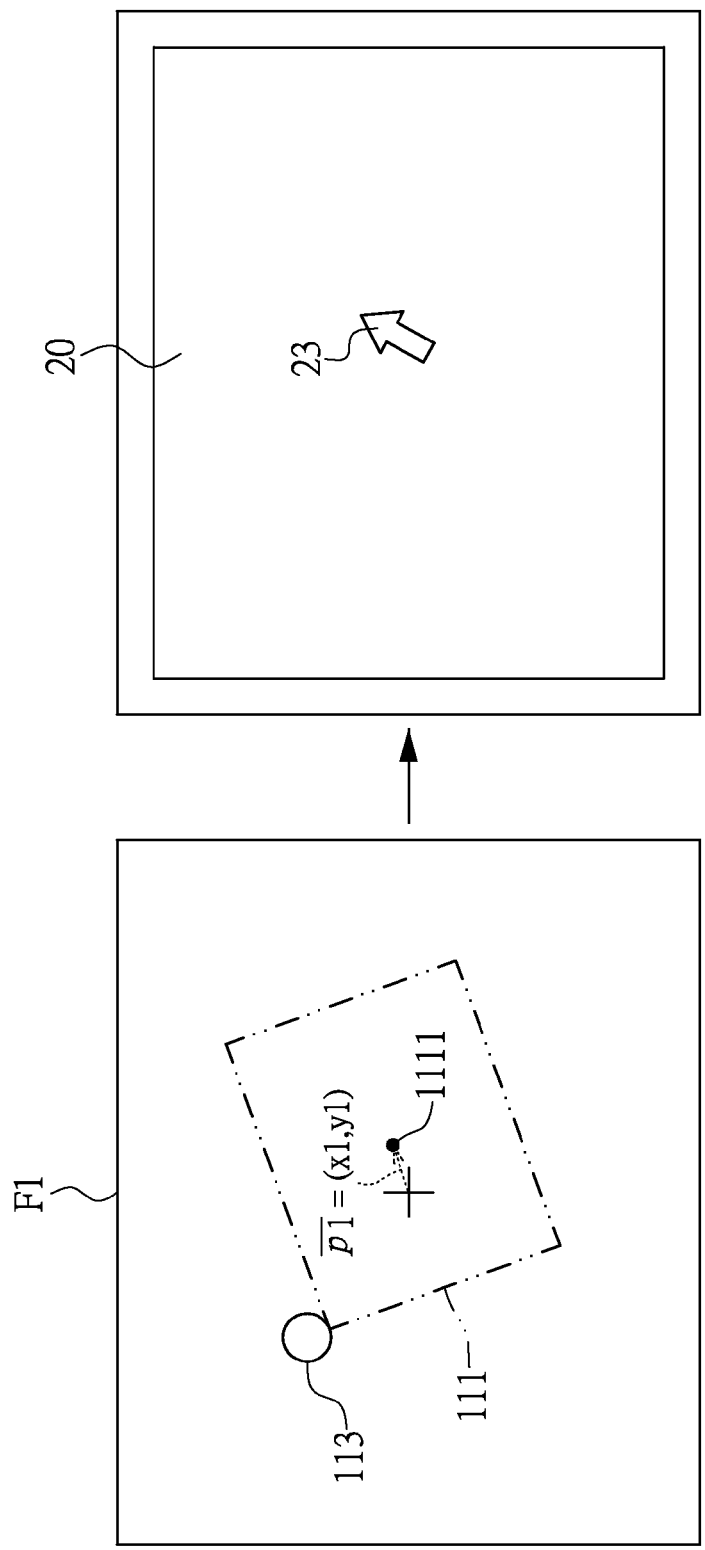
FIG. 6A is a diagram illustrating the movement of the reference point detected as the handheld pointer device moves and the correspondingly movement of the cursor displayed on a display apparatus provided in accordance to an exemplary embodiment of the present disclosure.
Figure 6B:
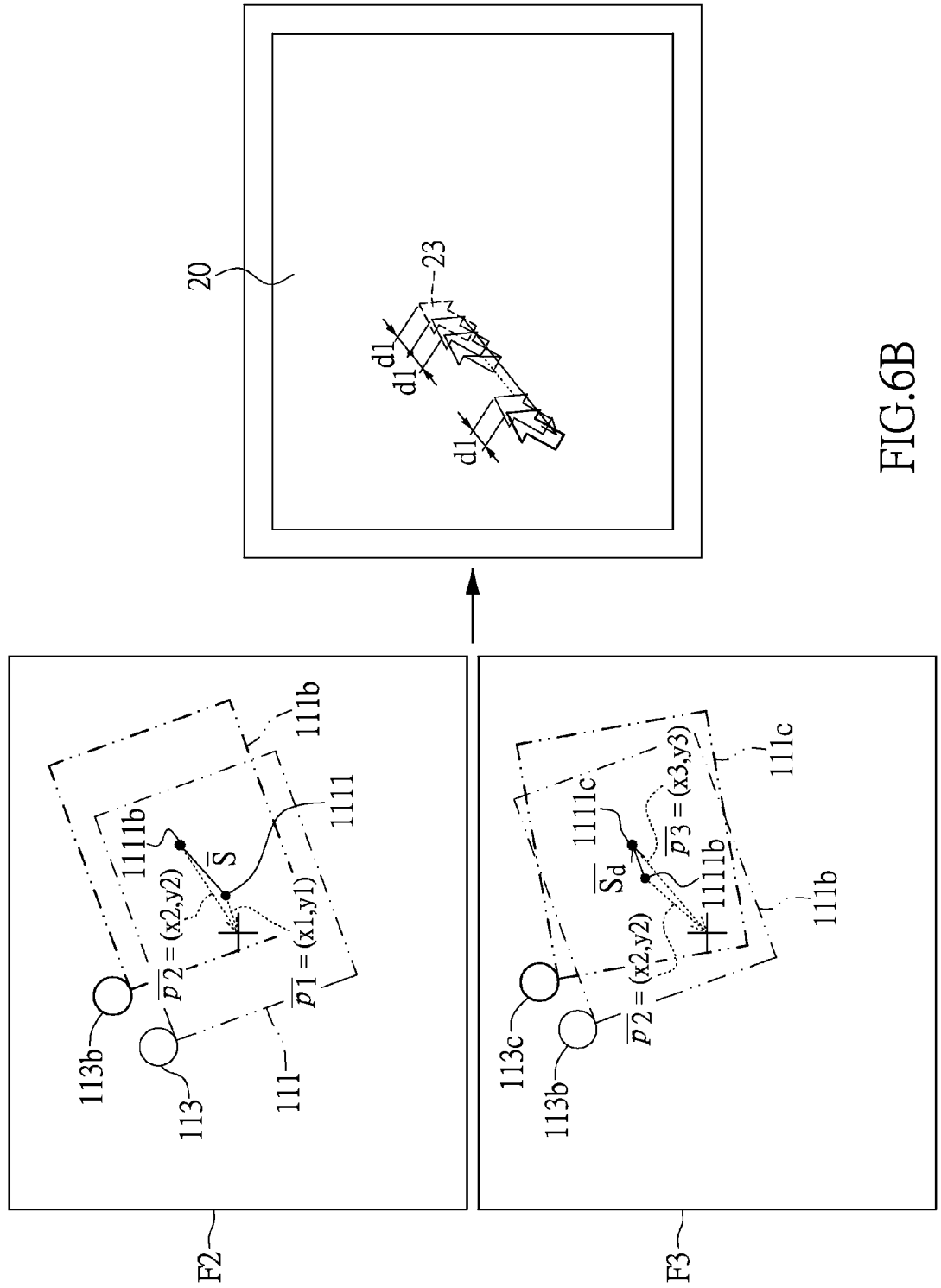
FIG. 6B is a diagram illustrating the movement of the reference point detected as the handheld pointer device moves provided in accordance to an exemplary embodiment of the present disclosure.
Figure 6C:
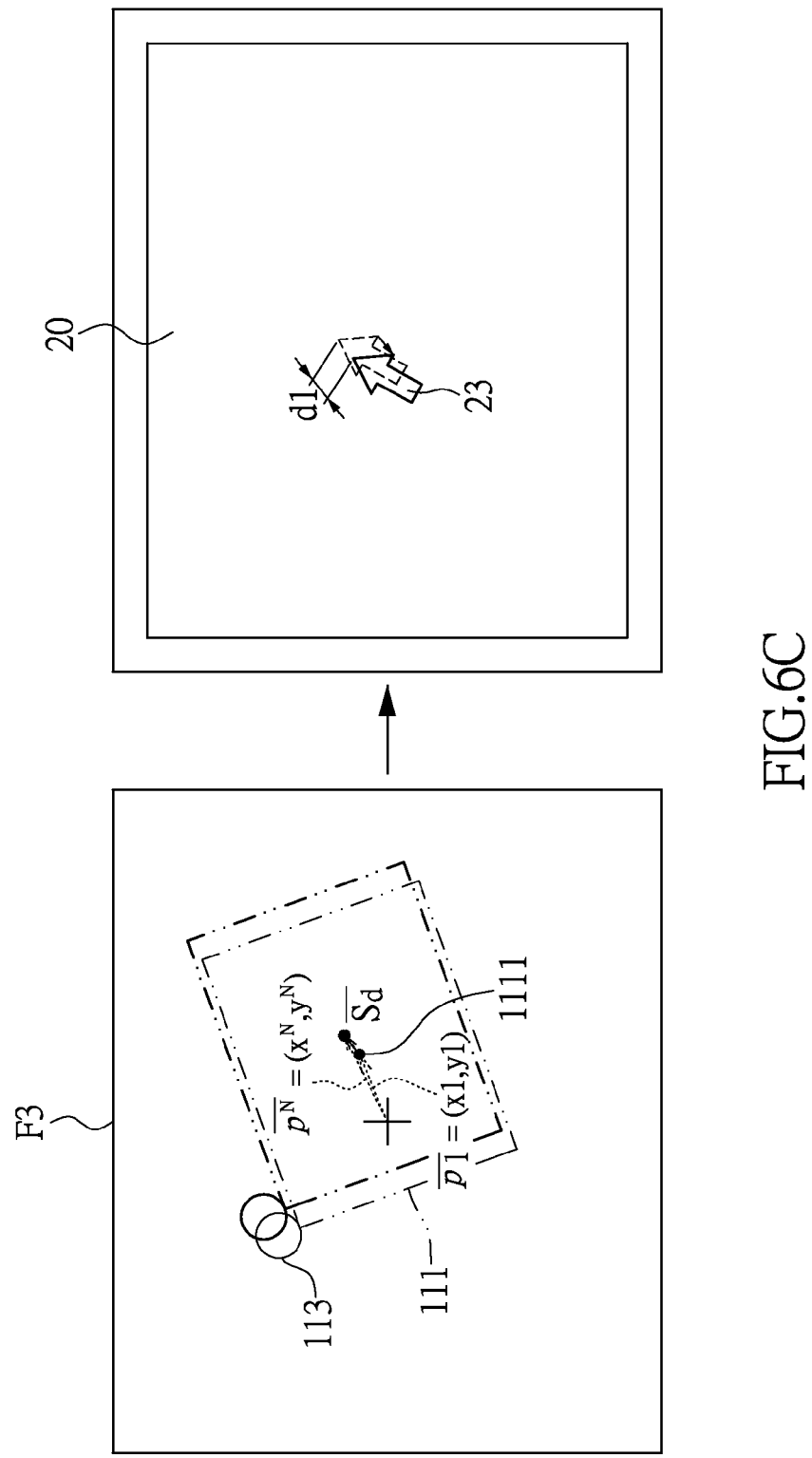
FIG. 6C~6D are diagrams respectively illustrating the movement of the reference point detected as the handheld pointer device moves and the correspondingly movement of the cursor displayed on a display apparatus provided in accordance to an exemplary embodiment of the present disclosure.
Figure 6D:
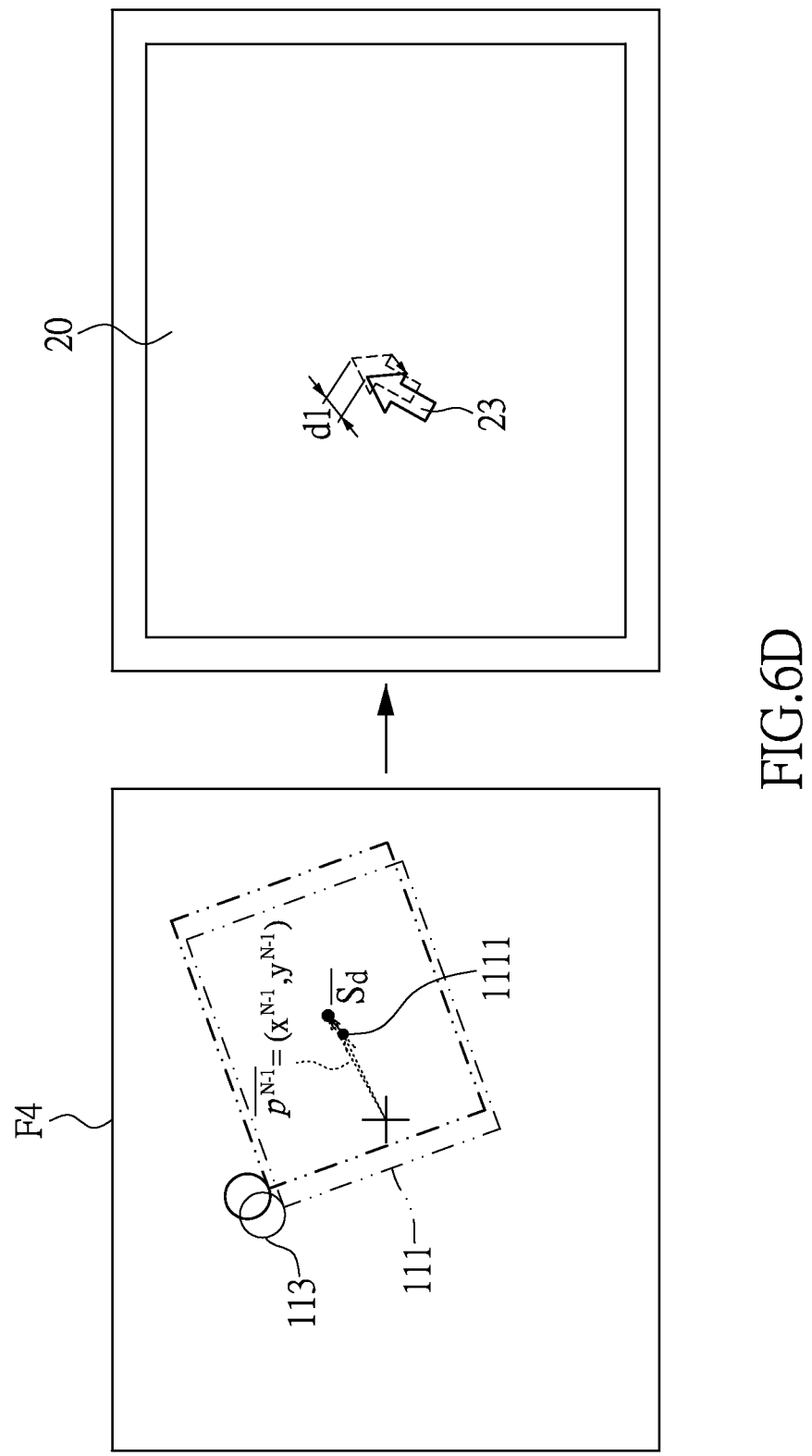
Figure 6E:
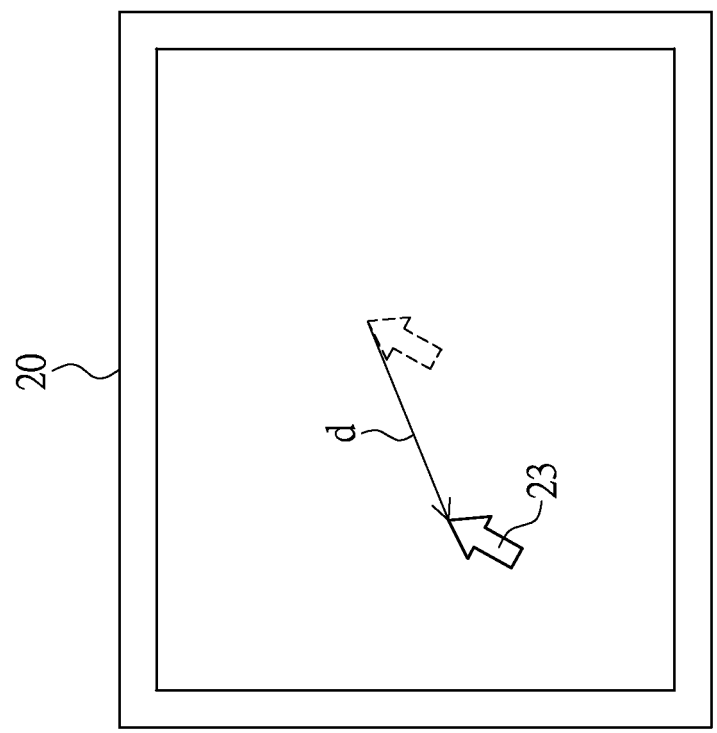
FIG. 6E is a diagram illustrating the movement of the cursor displayed on a screen shown by a display apparatus provided in accordance to an exemplary embodiment of the present disclosure.

6E. FIG. 5 shows a flowchart diagram illustrating a method for positioning a cursor in a relative positioning mode provided in accordance to an exemplary embodiment of the present disclosure. FIG. 6A shows a diagram illustrating the movement of the reference point detected as the handheld pointer device moves and the correspondingly movement of the cursor displayed on a screen shown by a display apparatus provided in accordance to an exemplary embodiment of the present disclosure. FIG. 6B is a diagram illustrating the movement of the reference point detected as the handheld pointer device moves provided in accordance to an exemplary embodiment of the present disclosure. FIG. 6C~6D show diagrams respectively illustrating the movement of the reference point detected as the handheld pointer device moves and the correspondingly movement of the cursor displayed on the screen shown by a display apparatus provided in accordance to an exemplary embodiment of the present disclosure. FIG. 6E shows a diagram illustrating the movement of the cursor displayed on a screen shown by a display apparatus provided in accordance to an exemplary embodiment of the present disclosure.

In Step S501, when the processing unit 12 determines that handheld pointer device 10 has exit from the pointer-lock mode, the processing unit 12 operatively initiate the pointing coordinate calibration program to cause the handheld pointer device 10 to enter the relative positioning mode.

In Step S503, the processing unit 12 sets the number of calibrations as N, the compensation vector as C and a starting point coordinate $\overline{p_s}$. The number of calibrations as N, the compensation vector as C and a starting point coordinate $\overline{p_s}$ are temporarily stored in the memory unit 15. The starting point coordinate $\overline{p_s}$ is configured to be the first pointing coordinate $\overline{p_1}$ of FIG. 6A. The first pointing coordinate $\overline{p_1}$ is the pointing vector which is computed by the processing unit 12 through using the center 1111 of the operating area 111 as the origin and computing the pointing vector of the center point "+" of the first image frame F1 in the operating area 111. The operating area 111 is defined based on the image position of the reference point image 113 formed in the first image frame F1.

The processing unit 12 can configure N according to the predetermined frame capturing rate or preset calibration time set by the user via the input unit 14. In one embodiment, the user may configure the handheld pointer device 10 to complete the pointing coordinate calibration program within five image frames according to the predetermined frame capturing rate and the processing unit 12 thus configures N to be 5. In another embodiment, the user may configure the preset calibration time to be 5 seconds (i.e. cause the handheld pointer device 10 to complete the pointing coordinate calibration program within 5 seconds) and the predetermined frame capturing rate to be five frames per second (fps), and the processing unit 12 thus configure the N to be 25.

Moreover, the processing unit 12 computes C by dividing N from the displacement vector $\overline{S}$. C is computed using Eq. (1)

$$C = \frac{\overline{S}}{N} = \frac{(\overline{p2} - \overline{p1})}{N} \qquad (1)$$

wherein C represents the compensation vector; $\overline{S}$ represents the displacement vector; $\overline{p_1}$ represents the first pointing coordinate; $\overline{p_2}$ represents the second pointing coordinate; N represents the number of calibrations. As illustrated by Eq. (1), the larger the N is, the smaller the C is per each calibration; the smaller the N is, the larger the C is per each calibration. It is worth to note that the pointing vector which is computed by the processing unit 12 through using the center 1111b of the operating area 111b as the origin and computing the pointing vector of the center point "+" of the second image frame F2 in the operating area 111b. The operating area 111b is defined based on the image position of the reference point image 113b formed in the second image frame F2.

In Step S505, the processing unit 12 computes a pointing coordinate displacement vector generated based on the movement of the handheld pointer device 10. As shown in FIG. 6B, the processing unit 12 can first compute a third image frame containing the reference point 21 and define the operating area 111c based on the image position of the reference point image 113c formed in the third image frame F3. Thereafter, the processing unit 12 uses the center 111c as the origin to compute the pointing vector of the center point "+" of the third image frame F3 in the operating area 111c and generates the third pointing coordinate $\overline{p_3}$. The third pointing coordinate $\overline{p_3}$ represents the pointing position of the center of the image sensing array of the image capturing unit 11 (i.e., the center point "+") in the third image frame F3 with respect to the coordinate system of the display apparatus 20 defined. Moreover, as shown in FIG. 6B, the third pointing coordinate $\overline{p_3}$ is represented by (x3, y3). The processing unit 12 subsequently computes the pointing coordinate displacement vector according to the second pointing coordinate $\overline{p_2}$ and the third pointing coordinate $\overline{p_3}$. The pointing coordinate displacement vector $\overline{S_d}$ is the movement of the pointing coordinate generated while the handheld pointer device 10 operates in the relative positioning mode. The third image frame F3 is captured at a later time than the second image frame F2.

Next in Step S507, the processing unit 12 computes the sum of the starting point coordinate $\overline{p_s}$, the pointing coordinate displacement vector $\overline{S_d}$ of the handheld pointer device 10, and C to generate a relative pointing coordinate $\overline{p^N}$ as shown in FIG. 6C. The relative pointing coordinate $\overline{p^N}$ is computed using Eq. (2), $$\overline{p^N} = \overline{p_s} + \overline{S_d} + C = \overline{p1} + (\overline{p3} - \overline{p2}) + \frac{(\overline{p2} - \overline{p1})}{N} \qquad (2)$$

In Step S509, the processing unit 12 generates and outputs the cursor parameter for controlling the display position of the cursor 23 displayed on the screen shown by the display apparatus 20 according to the relative pointing coordinate $\overrightarrow{p^N}$ computed. Specifically, the processing unit 12 outputs cursor parameter to cause the cursor 23 to translate smoothly to the target position which is a distance d1 from the current position as shown in FIG. 6C.

At the same time, in Step S511 and Step 513, the processing unit 12 configures the starting point coordinate $\overline{p_s}$ to be the relative pointing coordinate $\overline{p^N}$ computed and execute N−1 to update N to the previous N−1 (i.e. decrement the number of calibrations by one). The processing unit 12 stores the relative pointing coordinate $\overline{p^N}$ and the number of calibrations after decremented by one in the memory unit 15. In Step S515, the processing unit 12 further determines whether N is equal to zero, i.e., whether the pointing coordinate calibration program has been completed.

When the processing unit 12 has determined that N is equal to zero, i.e., the pointing coordinate calibration program has been completed, the processing unit 12 executes S517. Conversely, when the processing unit 12 determines that N is not equal to zero, i.e., the pointing coordinate calibration program has not been completed, the processing unit 12 returns to Step S505. That is, the processing unit 12 continue to drive the image capturing unit 11 to capture a forth image frame F4 and perform the computation of the pointing coordinate displacement vector $\overline{S_d}$, the relative pointing coordinates $\overline{p^{N-1}}$, and N–1 to cause the cursor 23 to translate to the position corresponding to the relative pointing coordinate $\overline{p^{N-1}}$ as shown in FIG. 6D, wherein the pointing coordinate displacement vector herein is generated as the handheld pointer device 10 moves according to a forth pointing coordinate $\overline{p_4}$ computed from the fourth image frame F4.

More specifically, the processing unit 12 computes the relative pointing coordinate $\overline{p^{N-1}}$ using Eq. (3) which is generated from Eq. (2), $$\overline{p^{N-1}} = \overline{p^N} + \overline{S_d} + C = \overline{p^N} + (\overline{p4} - \overline{p3}) + \frac{(\overline{p2} - \overline{p1})}{N} \quad (3)$$

wherein $\overline{p^N}$ represents the relative pointing coordinate computed previously; $\overline{S_d}$ represents the pointing coordinate displacement vector of the handheld pointer device 10 computed presently, i.e., the displacement vector between the third pointing coordinate $\overline{p_3}$ and the forth pointing coordinate $\overline{p_4}$; C is a constant value.

The processing unit 12 re-executes Steps S505~S515 and sequentially captures N–2 image frames (not shown) for computing $\overline{p^{N-2}}$, $\overline{p^{N-3}}$ and so on until N is equal to zero.

When the processing unit 12 completes the pointing coordinate calibration program, the cursor 23 displayed as show in FIG. 6E shifts N times from the position corresponding to the first pointing coordinate $\overline{p_1}$ to the position currently pointed by the handheld pointer device 10, wherein the cursor 23 translated smoothly according to the distance computed. Particularly, the cursor 23 displayed on the display apparatus 20 moves a distance d from a position corresponding to the first pointing coordinate $\overline{p_1}$ to the position corresponds to the pointing position of the handheld pointer device 10 with respect to the display apparatus 20 after the Nth image frame.

In Step S517, the processing unit 12 operatively causes the handheld pointer device 10 to exit the relative positioning mode and enters the absolute positioning mode, in which the processing unit 12 computes the cursor position of the cursor 23 in the absolute positioning mode.

That is to say, while the handheld pointer device 10 operates in the relative positioning mode, the processing unit 12 computes the cursor position of the cursor in the subsequent movement by using the first pointing coordinate $\overline{p1}$ as a starting point along with the displacement vector $\overline{S}$ and the pointing coordinate displacement vector $\overline{S_d}$ generated based on the movement of the handheld pointer device 10. Such that, after the handheld pointer device 10 has exited from the pointer-lock mode, the handheld pointer device 10 can operatively cause the cursor 23 to translate successfully and smoothly from the locking position to the position currently pointed by the handheld pointer device 10 within the preset calibration time or the preset number of calibrations, thereby prevents the cursor from suddenly jumping from one place to another and maintain the directivity of the handheld pointer device 10.

It is worth to note that, while operating in the relative positioning mode, the handheld pointer device 10 may also compute the cursor position without taking the pointing coordinate displacement vector $\overline{S_d}$ which is generated based on the movement of the handheld pointer device 10 into account. Specifically, the processing unit 12 can compute and correct the cursor position of the cursor in the subsequent movement by using the first pointing coordinate $\overline{p1}$ as a starting point along with the displacement vector $\overline{S}$ between the first pointing coordinate $\overline{p1}$ and the second pointing coordinate $\overline{p2}$ (i.e., the pointing coordinate displacement vector presently computed and generated).

In practice, the pointer positioning method of FIG. 3 and the method for computing a cursor position in a relative positioning mode can be corresponding implemented by writing the corresponding program codes into the processing unit 12 (such as microcontroller or an embedded controller) via firmware design and executed by the processing unit 12 during the operation of the handheld pointer device 10, however the present disclosure is not limited to thereto.

FIG. 3 is merely used for illustrating a pointer positioning method for the handheld pointer device 10, and the present disclosure is not limited thereto. Similarly, FIG. 5 is merely used for illustrating an implementation of computing the cursor position using the relative positioning method and shall not be used to limit the present disclosure. The operating area of FIG. 4A~FIG. 4C are merely used to illustrate the relative position between the operating area (i.e., the display area) of the display apparatus 20 and the center of the image sensing array of the image capturing unit 11 (i.e. the center pointer "+") and shall be used to limit the present disclosure. In other words, FIG. 4A~FIG. 4C and FIG. 6A~FIG. 6E are merely used to illustrate the operation of the handheld pointer device and the pointer positioning method in coordination with FIG. 3 and FIG. 5 and the present disclosure is not limited thereto.

(An Exemplary Embodiment of a Pointer Positioning Method)

Figure 7:
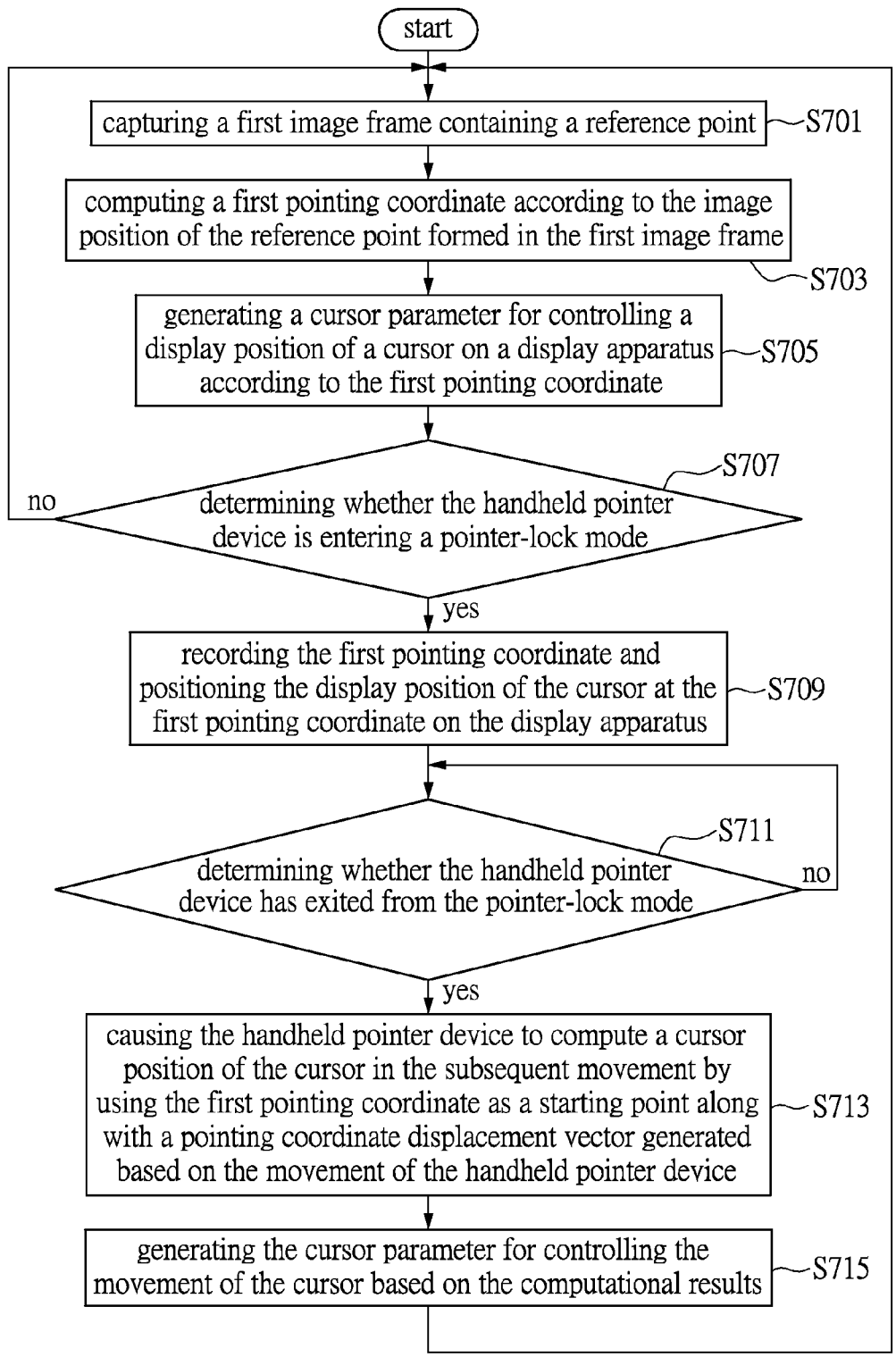
FIG. 7 is a flowchart diagram illustrating a pointer positioning method provided in accordance to an exemplary embodiment of the present disclosure.

From the aforementioned exemplary embodiments, the present disclosure can generalize another pointer positioning method for the aforementioned handheld pointer device of the interactive system. Please refer to FIG. 7 in conjunction with FIG. 1 and FIG. 2. FIG. 7 shows a flowchart diagram illustrating a pointer positioning method provided in accordance to an exemplary embodiment of the present disclosure.

The pointer positioning method of FIG. 7 can be implemented by programming the processing unit 12 via firmware design and executed by the processing unit 12 during the operation of the handheld pointer device 10.

In Step S701, the image capturing unit 11 of the handheld pointer device 10 is driven to capture and generate a first image frame as the handheld pointer device 10 pointing toward the position of the reference point.

In Step S703, the processing unit 12 computes a first pointing coordinate of the handheld pointer device 10 relative to the display apparatus 20 according to the image position of the reference point formed in the first image frame.

In Step S705, the processing unit 12 computes the cursor position of a cursor 23 in an absolute positioning mode and correspondingly generate the cursor parameter for controlling the display position of the cursor 23 displayed on the display apparatus 20. Cursor position computation method and position control method are essentially the same as described in the aforementioned embodiment, and further descriptions are hereby omitted.

In Step S707, the processing unit 12 determines whether the handheld pointer device 10 has entered a pointer-lock mode. As described previously, the processing unit 12 can determine whether the handheld pointer device 10 enters the pointer-lock mode based on the displacement of the pointing coordinate associated with the reference point image over consecutive image frames or whether the button unit 16 has been pressed.

When the processing unit 12 determines that the handheld pointer device 10 enters the pointer-lock mode, the processing unit 12 executes Step S709. Conversely, when the processing unit 12 determines that the handheld pointer device 10 continues to operate in the absolute positioning mode, the processing unit 12 returns to Step S701.

In Step S709, the processing unit 12 records the first pointing coordinate in the memory unit 15. At the same time, the processing unit 12 drives the communication unit 13 to continuously output the cursor parameter that corresponds to the first pointing coordinate, or to stop outputting any cursor parameter to the display apparatus 20 so as to fix the position of the cursor 23 displayed on the display apparatus 20.

In Step S711, the processing unit 12 can determine whether the handheld pointer device 10 has exited from the pointer-lock mode according to the displacement of the pointing coordinate computed for consecutive image frame or the operation of the button unit 16. When the processing unit 12 determines that the handheld pointer device 10 has exited from the pointer-lock mode, the processing unit 12 executes Step S713; otherwise, the processing unit 12 returns to Step S711.

In Step S713, the processing unit 12 operatively causes the handheld pointer device 10 to compute the cursor position of the cursor in the subsequent movement by using the first pointing coordinate as a starting point along with a pointing coordinate displacement vector generated based on the movement of the handheld pointer device 10 after determined that the handheld pointer device 10 has exited from the pointer-lock mode.

The processing unit 12 subsequently generates the cursor parameter for controlling the display position of the cursor 23. The processing unit 12 wirelessly transmits the cursor parameter to the display apparatus 20 via the communication unit 13 for correspondingly control the movement of the cursor 23 displayed on the display apparatus 20.

FIG. 7 is merely used for illustrating a pointer positioning method of the handheld pointer device and the present disclosure is not limited thereto. Those skilled in art shall be able to select the method for determining whether to cause the handheld pointer device to enter or to exit from the pointer-lock mode according to the practical operation requirements of the handheld pointer device 10. The method for computing the cursor position using the relative positioning method described in the aforementioned embodiment can be executed in Step S713 i.e., calibrating the display position of the cursor 23 within the preset calibration time and the number of calibrations using the relative positioning method.

(An Exemplary Embodiment of Method for Determining Whether to Cause the Handheld Pointer Device to Enter the Pointer-Lock Mode)

Figure 8:
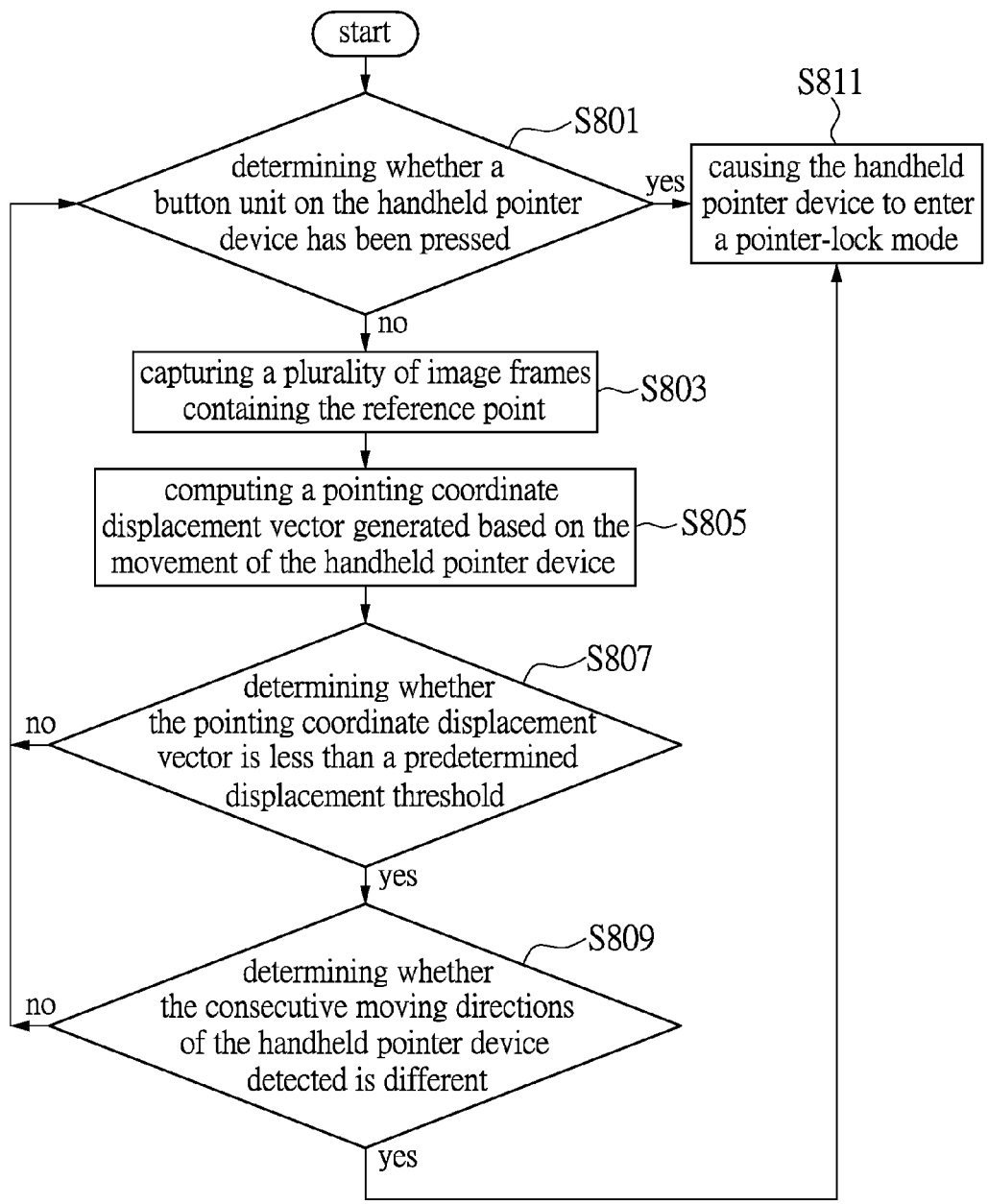
FIG. 8 is a flowchart diagram illustrating a method for a handheld pointer device to enter a pointer-lock mode provided in accordance to an exemplary embodiment of the present disclosure.
Figure 9B:
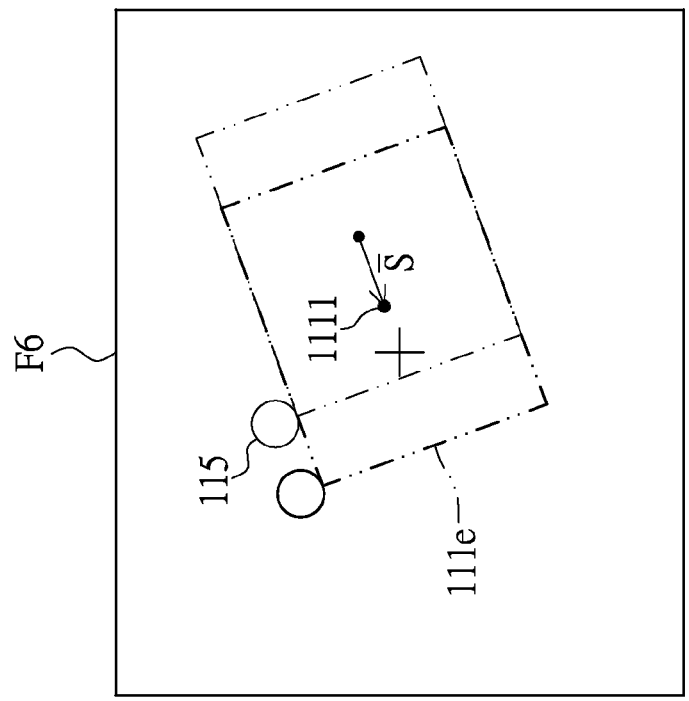
FIG. 9A~9B are diagrams respectively illustrating the movement of the reference point detected for determine whether to cause the handheld pointer device to enter the pointer-lock mode provided in accordance to an exemplary embodiment of the present disclosure.
Figure 9A:
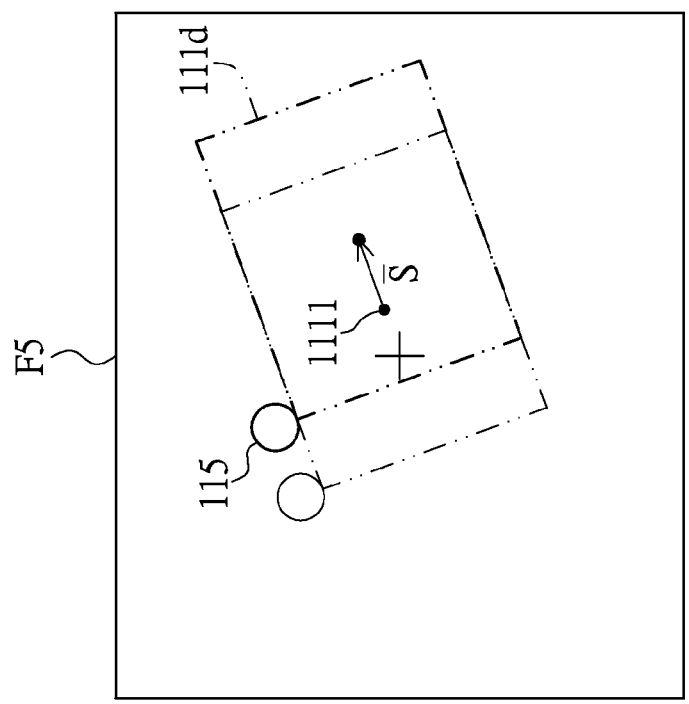

From the aforementioned exemplary embodiments, the present disclosure can generalize a method for determine whether to cause the handheld pointer device to enter a pointer-lock mode adapted for the aforementioned handheld pointer device of the interactive system. Please refer to FIG. 8 in conjunction with FIG. 1 and FIG. 9A~FIG. 9B. FIG. 8 shows a flowchart diagram illustrating a method for a handheld pointer device to enter a pointer-lock mode provided in accordance to an exemplary embodiment of the present disclosure. FIG. 9A~9B are diagrams respectively illustrating the movement of the reference point detected for determine whether to cause the handheld pointer device to enter the pointer-lock mode provided in accordance to an exemplary embodiment of the present disclosure.

In Step S801, the processing unit 12 of the handheld pointer device 10 determines whether the button unit 16 has been pressed down by a user. That is the processing unit 12 determines whether the user of the handheld pointer device has forcing the handheld pointer device 10 to enter the pointer-lock mode using the button unit 16.

When the processing unit 12 determined that the handheld pointer device 10 has been driven to enter the pointer-lock mode (e.g., when the button unit 16 has been pressed), the processing unit 12 executes Step S811. Otherwise, the processing unit 12 executes Step S803.

In Step S803, the processing unit 12 drives the image capturing unit 11 to capture images containing the reference point according to a predetermined frame capturing rate and generate a plurality of image frames.

Next, in Step S805, the processing unit 12 of the handheld pointer device computes the movement of the handheld pointer device 10 i.e., the displacement vector $\overline{S}$ between the pointing coordinates computed according to the image position corresponds to the reference point form in an image frame F5, as shown in FIG. 9 A.

In Step S807, the processing unit 12 determines whether the pointing coordinate displacement generated based on the movement of the handheld pointer device 10 is less than a predetermined displacement threshold (e.g., zero) according to the displacement vector $\overline{S}$ computed. When the processing unit 12 determines that the pointing coordinate displacement generated is less than the predetermined displacement threshold, the processing unit 12 executes Step S809; otherwise, the processing unit 12 returns to Step S801.

In Step S809, the processing unit 12 continues to determine whether the consecutive moving direction of the handheld pointer device 10 is different according to the display vector $\overline{S}$ computed. As shown in FIG. 9A and FIG. 9B, the processing unit 12 can compute and obtain that the pointing coordinate associated with the center of the sensing array of the image capturing unit 11 (i.e., the center point "+") mapped onto the operating area 111d positioned relative to the display apparatus 20 in the image frame F5 has shifted toward the right and then shifted from right toward left in the successive image frame F6, that is the handheld pointer device 10 is continuously moving between left and right. The image frame F6 is captured at a later time than the image frame F5. Accordingly, the processing unit 12 can determine that the consecutive moving direction of the handheld pointer device 10 is different and executes Step S811. Conversely, when the processing unit 12 determines that the consecutive moving direction of the handheld pointer device 10 is the same, the processing unit 12 executes Step S801.

In Step S811, the processing unit 12 drives the handheld pointer device 10 to enter the pointer-locking mode and causes the display position of the cursor 23 to be fixed at a corresponding position on the display apparatus 20.

It is worth to note that after the handheld pointer device 10 entered the pointer-lock mode, the processing unit 12 may through actively detecting the pressing state of the button unit 16 to automatically cause the handheld pointer device 10 to stay in or exit the pointer-lock mode. Or the processing unit 12 may determine whether the movement of the reference point in the image captured, i.e., determines whether the pointing coordinate displacement generated based on the handheld pointer device 10 is greater than the predetermined. In particular, the processing unit 12 operatively causes the handheld pointer device 10 to exit from the pointer-lock mode when determined that that the pointing coordinate displacement generated based on the handheld pointer device 10 is greater than the predetermined displacement threshold.

Additionally, FIG. 8 is merely used for illustrating a method for determining whether to drive a handheld pointer device to enter a pointer-lock mod and the present disclosure is not limited thereto. Those skilled in art shall be to select the appropriate method adopted for determining whether to cause the handheld pointer device to enter or to exit from the pointer-lock mode according to the practical operation requirement of the handheld pointer device. In practice, Steps S807 (e.g., step for determining the movement of the handheld pointer device 10) and S809 (step for determining the moving direction of the handheld pointer device) can be configured to executed at the same time or only execute one of Step S807 and Step S809 depending upon the practical operational requirement of the handheld pointer device 10. Moreover, the predetermined displacement threshold can be configured according to the application of the handheld pointer device 10 and shall not be used to limit the scope of the present disclosure.

(Another Exemplary Embodiment of Relative Positioning Method)

The present disclosure further provide a method for determine whether the reference point has exceeds the operating area according to the pointing coordinate computed, and the method can be adopted for the aforementioned handheld pointer device of the interactive system.

Figure 2:
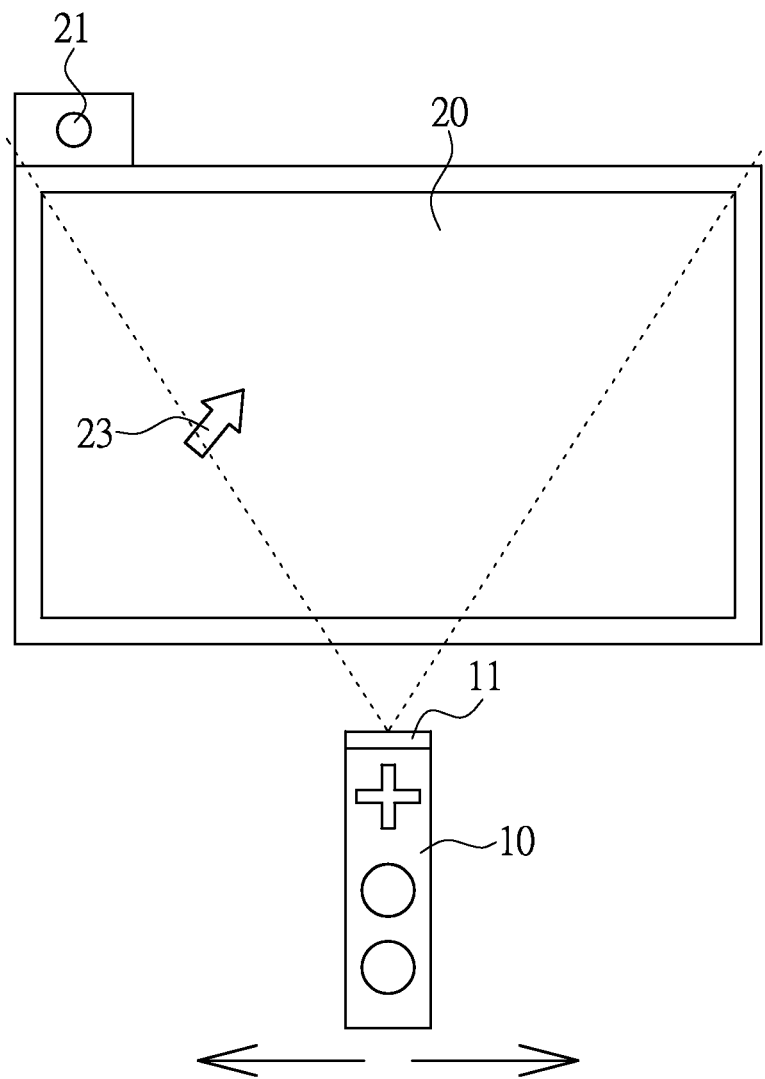
FIG. 2 is an operational diagram of a handheld pointer device in an interactive system provided in accordance to an exemplary embodiment of the present disclosure.
Figures 1, 10:
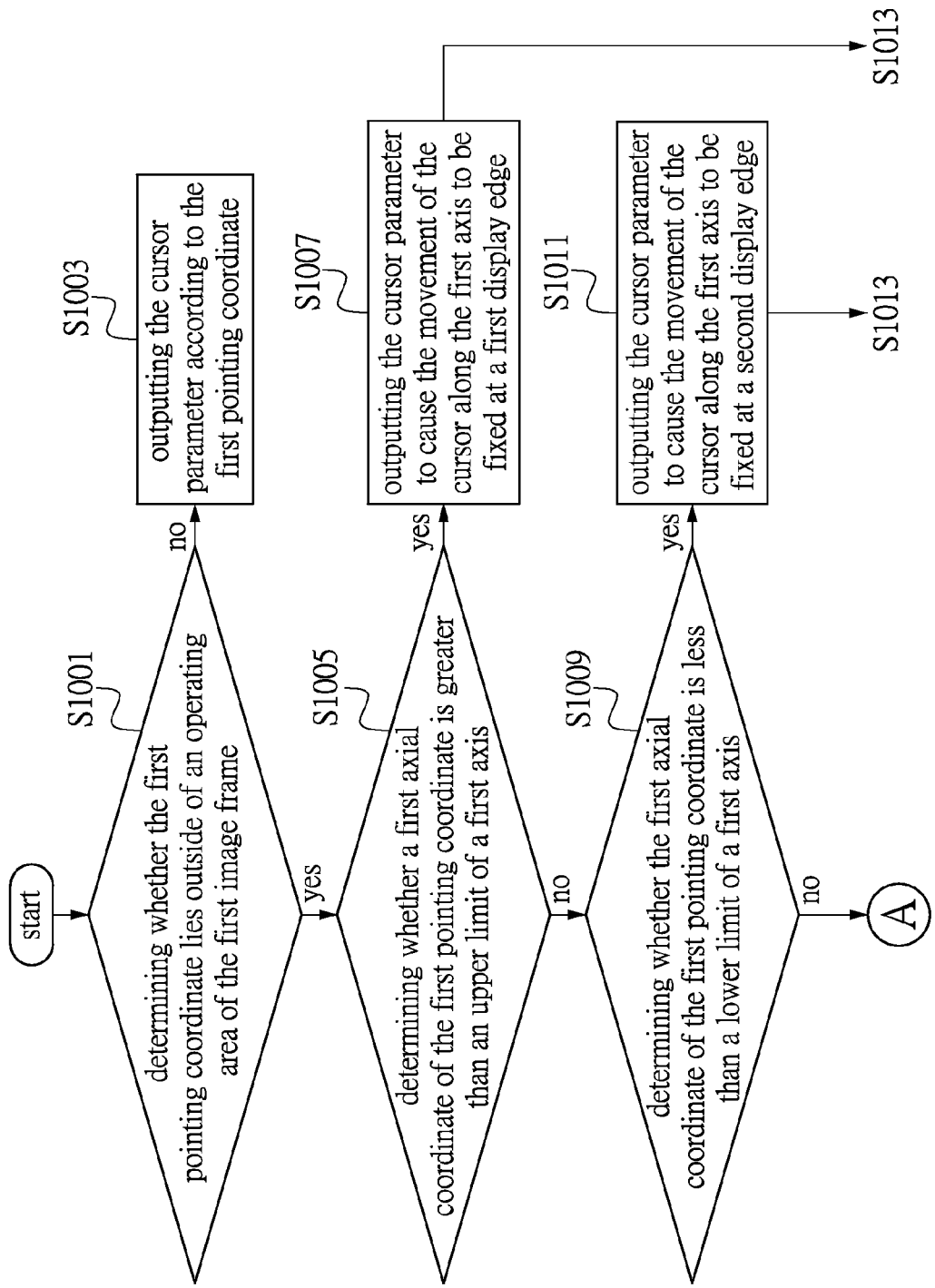
Figures 2, 10:
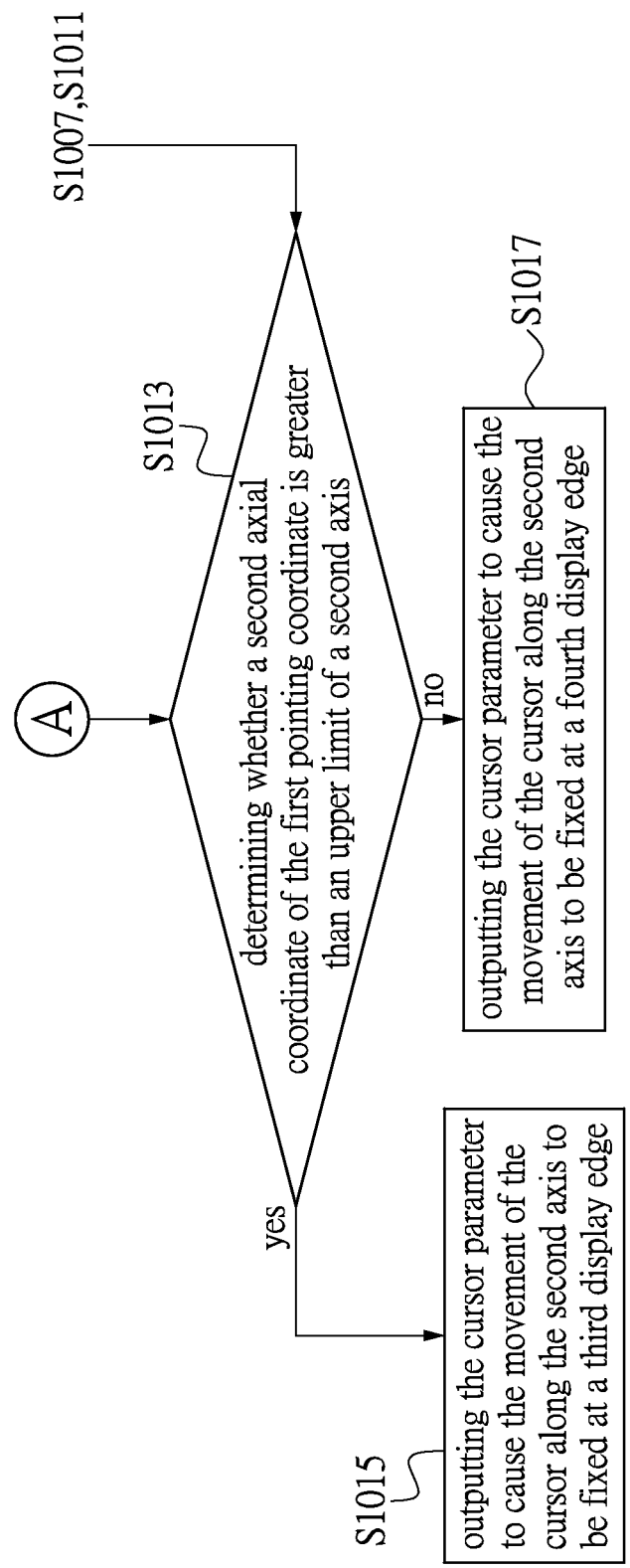

Please refer to FIG. 10-1 and FIG. 10-2 in conjunction to FIG. 1 and FIG. 11A~FIG. 11D. FIG. 10-1 and FIG. 10-2 show flowchart diagrams illustrating a boundary calibration of a handheld pointer device provided in accordance to an exemplary embodiment of the present disclosure. FIG. 11A~FIG. 11D are diagrams respectively illustrating the movement of the reference point detected as the handheld pointer device moves and the correspondingly movement of the cursor displayed on a display apparatus provided in accordance to an exemplary embodiment of the present disclosure.

The method of determining whether the reference point exceeds the operating area can be implemented by programming the processing unit 12 via firmware design and executed by the processing unit 12 while handheld pointer device 10 is in operation. The processing unit 12 can be a processing chip such as a microcontroller or embedded controller which programmed with the necessary firmware and disposed in the handheld pointer device 10 and the present disclosure is not limited thereto The operating area 111 defined in a first image frame F1 shown in FIG. 11A~FIG. 11D corresponds to the display apparatus 20 and is scaled with a preset predefined display ratio. As shown in FIG. 11A~FIG. 11D, the operating area 111 is a region configured to be bounded by an upper limit Y_MAX of a first axis DE1 of the display apparatus 20, a lower limit Y_MIN of the first axis DE1, an upper limit X_MAX of a second axis DE2 of the display apparatus 20, and a lower limit X_MIN of the second axis DE2.

The upper limit Y_MAX of the first axis DE1 corresponds to a first display edge 201 of the display apparatus 20. The lower limit Y_MIN of the first axis DE1 corresponds to a second display edge 203 of the display apparatus 20. The upper limit X_MAX of the second axis DE2 corresponds to a third display edge 205 of the display apparatus 20. The lower limit X_MIN of the second axis DE2 corresponds to a fourth display edge 207 of the display apparatus 20.

The method depicted in FIG. 10-1 and FIG. 10-2 can be executed after obtaining a first pointing coordinate $\overline{p1'''}$ according to the image position of the reference point image formed in the first image frame F1 in coordination with setting the center 1111 of the operating area 111 as the origin in FIG. 3 and FIG. 5. More specifically, FIG. 10-1 and FIG. 10-2 can be used to determine whether the first pointing coordinate $\overline{p1'''}$ exceeds the operating area 111 that corresponds to the display area of the display apparatus 20. In the instant embodiment, the first pointing coordinate $\overline{p1'''}$ comprises a first axial coordinate and a second axial coordinate. The first axial coordinate is located on the first axis DE1, while the second axial coordinate is located on the second axis DE2.

In Step S1001, the processing unit 12 determines whether the first pointing coordinate $\overline{p1'''}$ lies outside of operating area 111 of first image frame. That is, the processing unit 12 determinate whether the center of the image sensing array of the image capturing unit 11 (i.e., the center point "+") is lying outside the operating area 111 corresponds to the display area of the display apparatus 20 according to the first pointing coordinate $\overline{p1'''}$.

When the processing unit 12 determines that the first pointing coordinate $\overline{p1'''}$ lies outside of the operating area 111, the processing unit 12 executes Step S1005. On the other hand, when the processing unit 12 determines that the first pointing coordinate $\overline{p1'''}$ lies inside of the operating area 111, the processing unit 12 executes Step S1003.

In Step S1003, the processing unit 12 generates a cursor parameter for controlling the display position of the cursor on the display apparatus 20 according to the first pointing coordinate $\overline{p1'''}$. The processing unit 12 further drives the communication unit 13 to output the cursor parameter associated with the first pointing coordinate $\overline{p1'''}$ to the display apparatus 20 so as to cause the cursor 33 to be correspondingly displayed on the display apparatus 20.

In Step S1005, the processing unit 12 determines whether the first axial coordinate of the first pointing coordinate $\overline{p1'''}$ is greater than the upper limit Y_MAX of the first axis DE1 of the operating area 111. When the processing unit 12 determines that the first axial coordinate of the first pointing coordinate $\overline{p1'''}$ (e.g., the first pointing coordinate $\overline{p1'''}$ of FIG. 11A) is greater than the upper limit Y_MAX of the first axis DE1 of the operating area 111, the processing unit 12 executes Step S1007. On the other hand, when the processing unit 12 determines that the first axial coordinate of the first pointing coordinate $\overline{p1'''}$ is less than the upper limit Y_MAX of the first axis DE1 of the operating area 111, the processing unit 12 executes Step S1009.

Figure 11A:
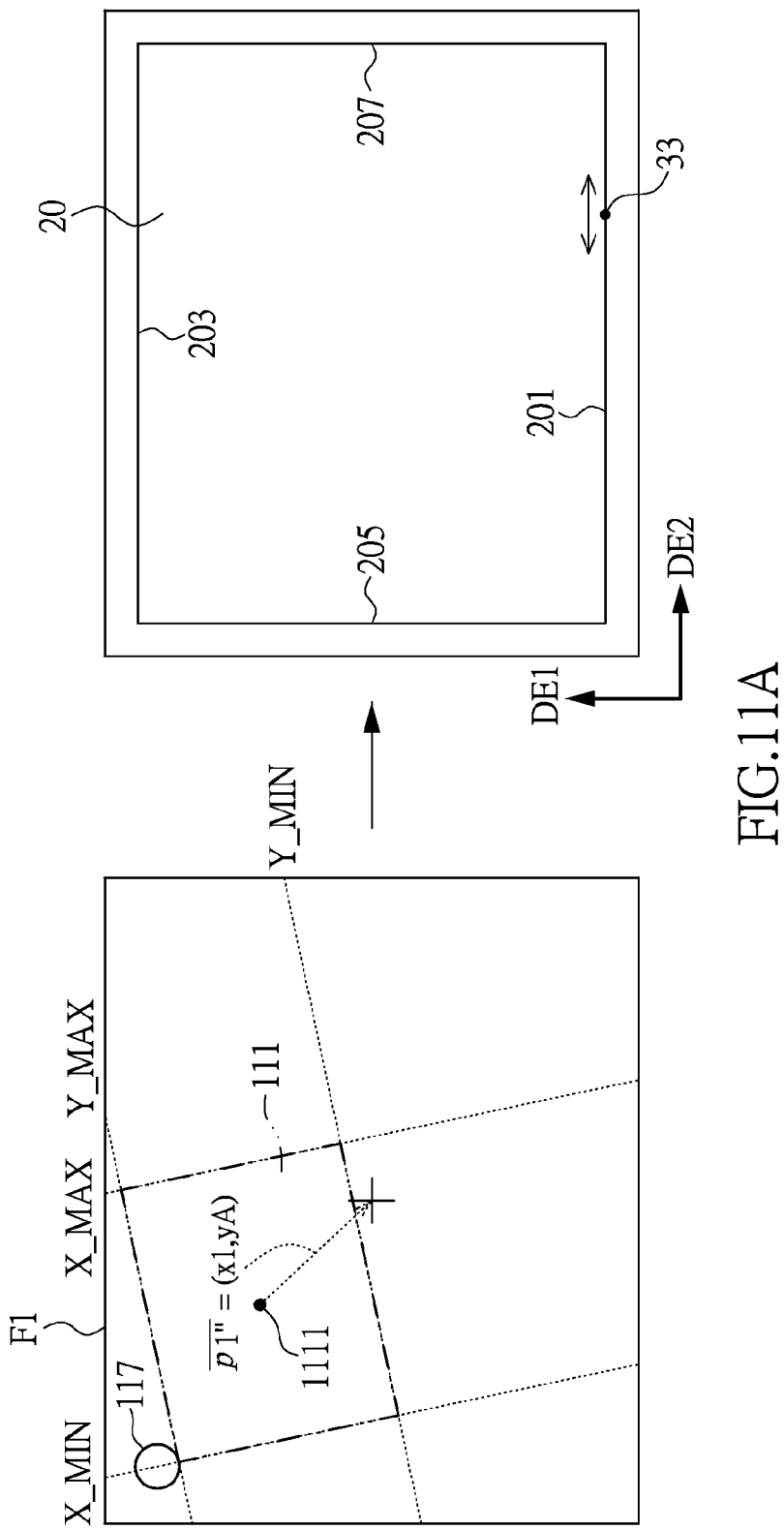
FIG. 11A~11D are diagrams respectively illustrating the movement of the reference point detected as the handheld pointer device moves and the movement of the cursor displayed on a display apparatus provided in accordance to an exemplary embodiment of the present disclosure.

In Step S1007, as shown in FIG. 11A, the processing unit 12 drives the communication unit 13 to output the cursor parameter to cause the movement of the cursor 33 along the first axis DE1 to be fixed at the first display edge 201, while the movement of the cursor 33 along the second axis DE2 is configured according to the second axial coordinate of the first pointing coordinate $\overline{p1'''}$ (e.g., the second axial coordinate x1 of FIG. 11A). The processing unit 12 executes Step S1013 thereafter.

In Step S1009, the processing unit 12 determines whether the first axial coordinate of the first pointing coordinate $\overline{p1'''}$ is less than the lower limit Y_MIN of the first axis DE1 of the operating area 111. When the processing unit 12 determines that the first axial coordinate of the first pointing coordinate $\overline{p1'''}$ (e.g., the first pointing coordinate $\overline{p1'''}$ of FIG. 11B) is less than the lower limit Y_MIN of the first axis DE1 of the operating area 111, the processing unit 12 executes Step S1011. On the other hand, when the processing unit 12 determines that the first axial coordinate of the first pointing coordinate $\overline{p1'''}$ is greater than the lower limit Y_MIN of the first axis DE1 of the operating area 111, the processing unit 12 executes Step S1013.

Figure 11B:
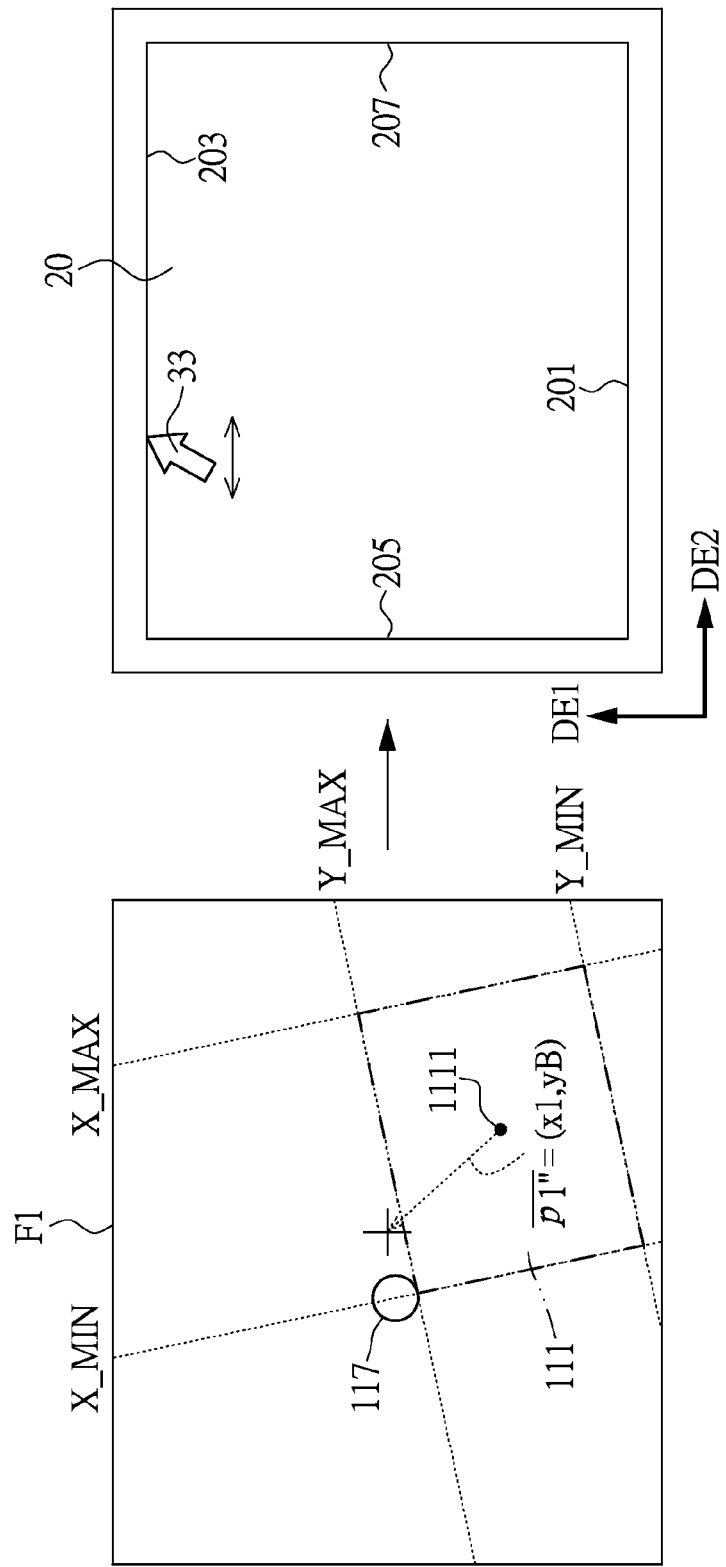

In Step S1011, as shown in FIG. 11B, the processing unit 12 drives the communication unit 13 to output the cursor parameter to cause the movement of the cursor 33 along the first axis DE1 to be fixed at the second display edge 203, while the movement of the cursor 33 along the second axis DE2 is configured according to the second axial coordinate of the first pointing coordinate $\overline{p1'''}$ (e.g., the second axial coordinate x1 of FIG. 11B). The processing unit 12 executes Step S1013 thereafter.

In Step S1013, the processing unit 12 determines whether the second axial coordinate of the first pointing coordinate $\overline{p1'''}$ is greater than the upper limit X_MAX of the second axis DE2 of the operating area 111. When the processing unit 12 determines that the second axial coordinate of the first pointing coordinate $\overline{p1'''}$ (e.g., the first pointing coordinate $\overline{p1'''}$ of FIG. 11C) is greater than the upper limit X_MAX of the second axis DE2 of the operating area 111, the processing unit 12 executes Step S1015. On the other hand, when the processing unit 12 determines that the second axial coordinate of the first pointing coordinate $\overline{p1'''}$ is less than the upper limit X_MAX of the second axis DE2 of the operating area 111, the processing unit 12 executes Step S1017.

Figure 11C:
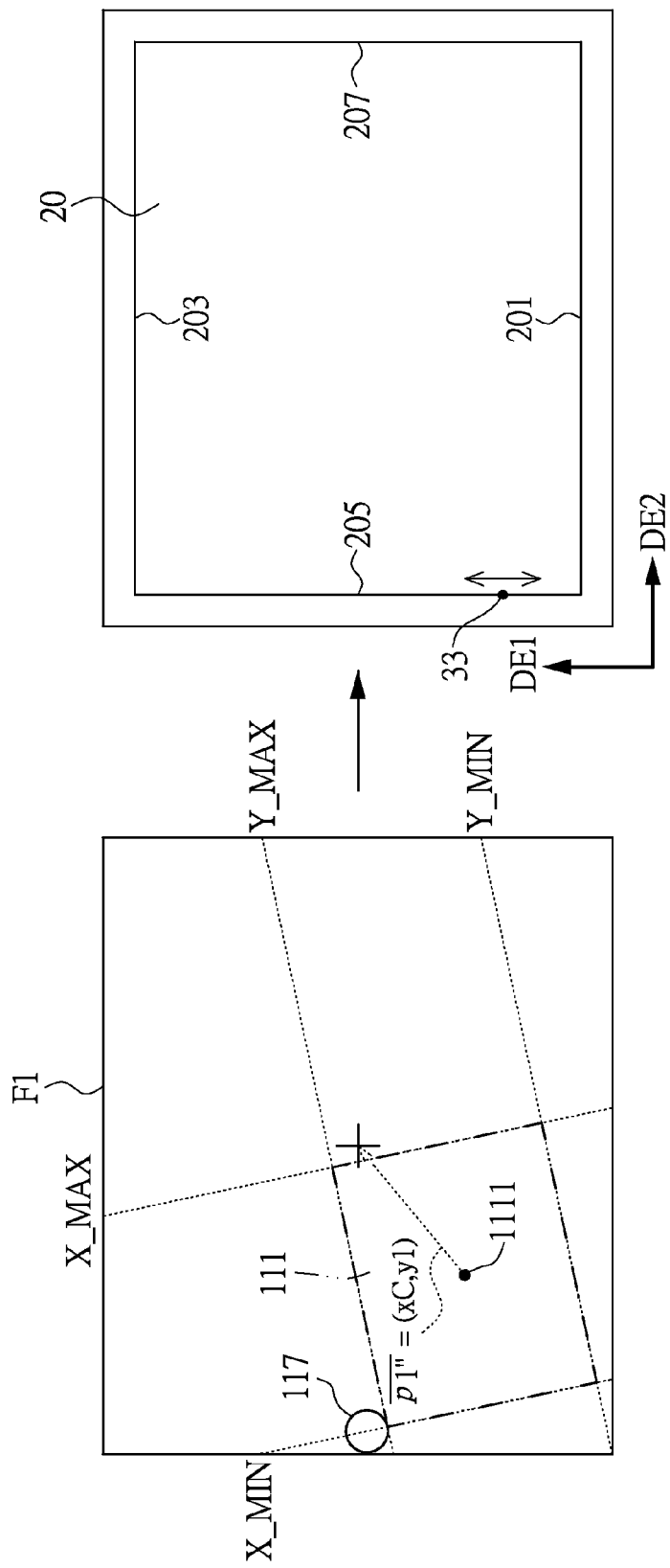
Figure 11D:
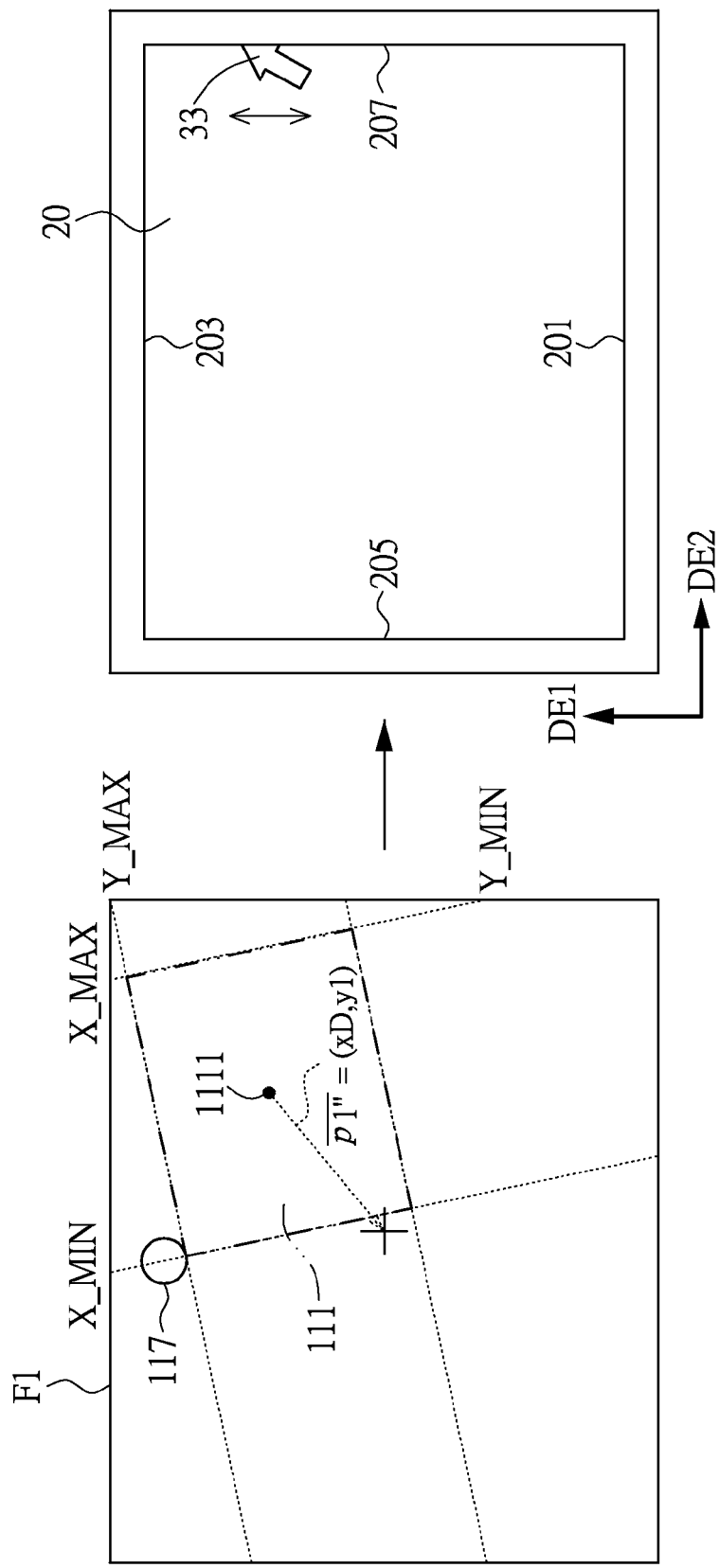

In Step S1015, as shown in FIG. 11C, the processing unit 12 drives the communication unit 13 to output the cursor parameter to cause the movement of the cursor 33 along the second axis DE2 to be fixed at the third display edge 205, while the movement of the cursor 33 along the first axis DE1 is configured according to the first axial coordinate of the first pointing coordinate $\overline{p1'''}$ (e.g., the first axial coordinate y1 of FIG. 11C).

In Step S1017, the processing unit 12 determines that the second axial coordinate of the first pointing coordinate $\overline{p1'''}$ (e.g., the first pointing coordinate $\overline{p1'''}$ of FIG. 11D) is less than the lower limit X_MIN of the second axis DE2 of the operating area 111. The processing unit 12 drives the communication unit 13 to output the cursor parameter to cause the movement of the cursor 33 along the second axis DE2 to be fixed at the fourth display edge 207, while the movement of the cursor 33 along the first axis DE1 is configured according to the first axial coordinate of the first pointing coordinate $\overline{p1'''}$ (e.g., the first axial coordinate y1 of FIG. 11D).

In short, the method depicted in FIGS. 10-1 and 10-2 can be performed after obtaining the pointing coordinate from the image frames captured so as to determinate whether the cursor lies outside of the display area of the display apparatus 20. During the execution of the method depicted in FIG. 10 (i.e., the boundary calibration program), when the cursor 33 is determined to be outside of at least a boundary of the display area of the display apparatus 20, the cursor 33 can be automatically fixed at the respective boundary in the process to complete the boundary calibration program.

It shall be note that the instant embodiment uses the first pointing coordinate as an illustration for the boundary calibration, however in practice, the processing unit of the handheld pointer device can operatively detect whether pointing coordinates (e.g., the second pointing coordinate and the third pointing coordinate) computed from the image frames (e.g., the second image frame and the third image frame) fall outside of the operating area of the image frame using the method depicted in FIGS. 10-1 and 10-2 and perform the boundary calibration upon detect that any of the pointing coordinate exceeds the operating area.

FIG. 10-1 and FIG. 10-2 are merely used for illustrating an implementation of boundary calibration and the present disclosure is not limited thereto. Those skilled in the art shall be able to configure the operating area 111 of the first image frame F1 with respect to the display area of the display apparatus 20 i.e., the upper limit Y_MAX of the first axis DE1, the lower limit Y_MIN of the first axis DE1, the upper limit X_MAX of the second axis, and the lower limit X_MIN.

(Another Exemplary Embodiment of a Pointer Positioning Method)

Figure 12:
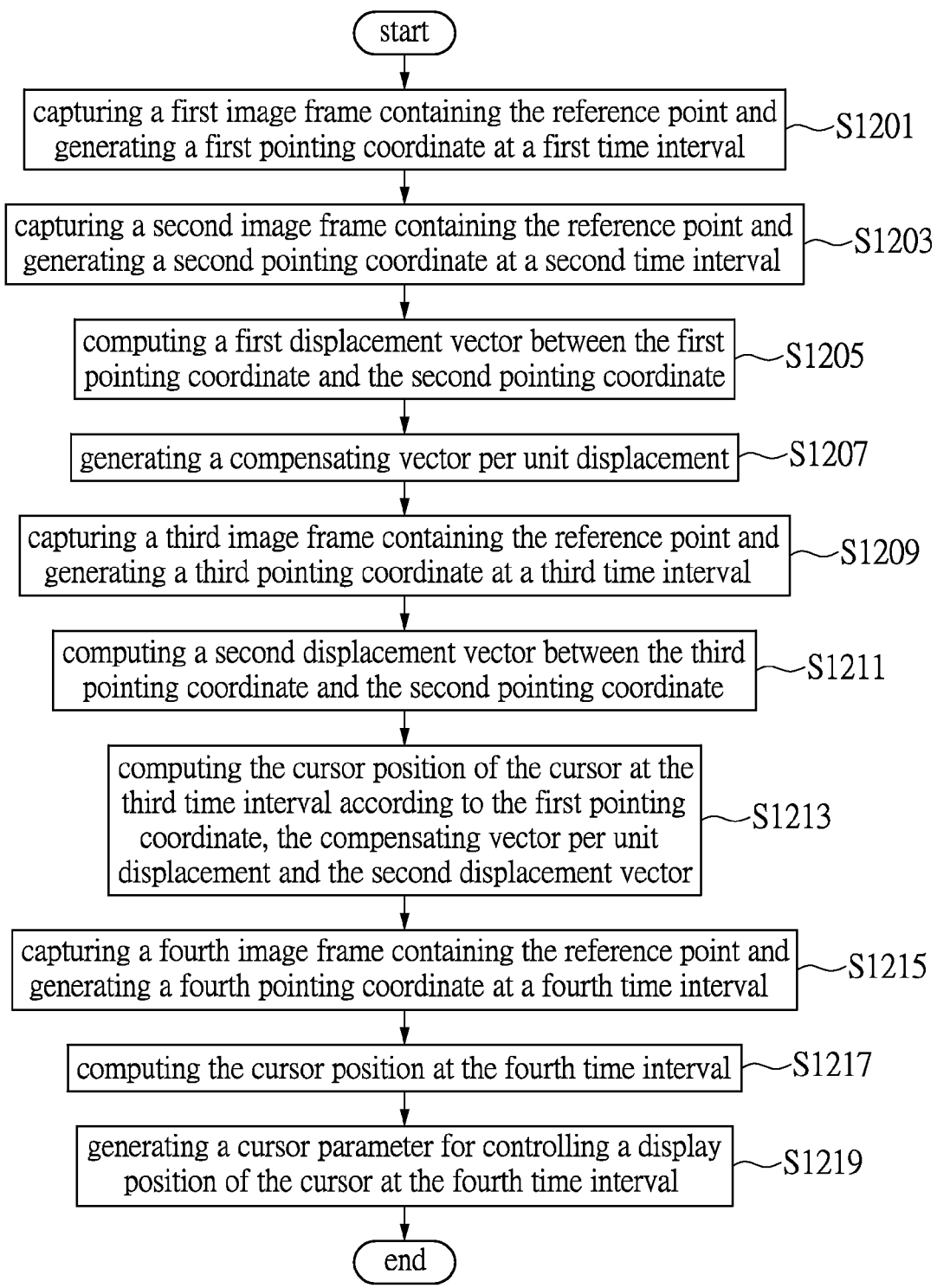
FIG. 12 is a flowchart diagram illustrating a pointer positioning method provided in accordance to another exemplary embodiment of the present disclosure.

From the aforementioned exemplary embodiments, the present disclosure can generalize another pointer positioning method for the aforementioned handheld pointer device of the interactive system. Please refer to FIG. 12 in conjunction with FIG. 1 and FIG. 2. FIG. 12 shows a flowchart diagram illustrating a pointer positioning method provided in accordance to another exemplary embodiment of the present disclosure.

The pointer positioning method of FIG. 12 can be implemented by programming the processing unit 12 via firmware design and executed by the processing unit 12 while the handheld pointer device 10 is in operation.

In Step 1201, the image capturing unit 11 of the handheld pointer device 10 is driven to capture and generate a first image frame containing the reference point 21 at a first time interval for the processing unit 12 to compute a first pointing coordinate of the handheld pointer device 10 relative to the display apparatus 20 at the first time interval according to the image position of the reference point 21 formed in the first image frame. The processing unit 12 further fixedly positions the display position of the cursor 23 at the first pointing coordinate according to the first pointing coordinate computed and causes the handheld pointer device 10 to enter the pointer-lock mode.

The processing unit 12 then generates a cursor parameter for controlling the display position of the cursor 23 on the display apparatus 20. More specifically, the processing unit 12 can drives the communication unit 13 to continuously output the cursor parameter that corresponds to the first pointing coordinate $\overline{p}_1$, or stop outputting any cursor parameter to the display apparatus 20 so as to fix the display position of the cursor 23 at the first pointing coordinate. Cursor computation method and position control method are essentially the same as described in the aforementioned embodiment, and further descriptions are hereby omitted.

In Step S1203, at a second time interval, the processing unit 12 causes the handheld pointer device 10 to exit the pointer-lock mode. The processing unit 12 drives the image capturing unit 11 to capture and generate a second image frame containing the reference point 21 at the second time interval. The processing unit 12 computes a second pointing coordinate of the handheld pointer device 10 relative to the display apparatus 20 according to the image position of the reference point 21 formed in the second image frame. The second time interval occurs after the first time interval. That is, the second image frame is captured at a later time than the first image frame.

In Step S1205 the processing unit 12 computes a first displacement vector between the first pointing coordinate and the second pointing coordinate.

In Step S1207, the processing unit 12 generates a compensating vector per unit displacement according to the first displacement vector. As described previously, the processing unit 12 can compute the compensating vector per unit displacement according to a preset number of calibrations or a preset calibration time. In one embodiment, the handheld pointer device 10 may generate the compensating vector per unit displacement by dividing the preset number of calibrations or the preset calibration time from the first displacement vector. The preset number of calibrations or the preset calibration time can be configured according to a predetermined frame capturing rate or a predetermined time.

In Step S1209, the processing unit 12 drives the image capturing unit 11 to capture and generate a third image frame at a third time interval. The processing unit 12 computes a third pointing coordinate of the handheld pointer device 10 relative to the display apparatus 20 according to the image position of the reference point 21 formed in the third image frame. The processing unit 12 initiates a pointing coordinate calibration program at the third time interval and computing the cursor position of the cursor 23 in a relative position mode. The third time interval occurs after the second time interval. That is the third image frame is captured at a later time than the second image frame.

In Step S1211, at the third time interval, the processing unit 12 computes a second displacement vector between the third pointing coordinate and the second pointing coordinate. The processing unit 12 obtains the second displacement vector by computing the distance between the third pointing coordinate and the second pointing coordinate.

In Step S1213, the procession unit 12 of the handheld pointer device 10 computes the display position of the cursor displayed on the display apparatus at the third time interval according to the first pointing coordinate, the compensating vector per unit displacement and the second displacement vector. Specifically, the handheld pointer device 10 generates the cursor parameter for controlling the movement of the cursor 23 on the display apparatus 20. The processing unit 12 drives the communication unit 13 to wirelessly transmit the cursor parameter to the display apparatus 20 to control the display position of the cursor 23 on the display apparatus at the third time interval.

Thereafter in a fourth time interval, the handheld pointer device 10 completes the execution of the pointing coordinate calibration program and enters the computes the cursor position of the cursor using absolute positioning method. In Step S1215, the processing unit 12 drives the image capturing unit 11 to generate a fourth image frame containing the reference point 21 and computes a fourth pointing coordinate of the handheld pointer device 10 relative to the display apparatus 20 according to the image position of the reference point 21 formed in the fourth image frame. The fourth time interval occurs after the third time interval. That is, the fourth image frame is captured at a later time than the third image frame. The time interval between the third time interval and the fourth time interval can be configured based on the preset number of calibrations or preset calibration time. The implementation of the relative positioning mode is the same as described in the aforementioned embodiment, and further descriptions are hereby omitted.

In Step 1217, the processing unit 12 computes the display position of the cursor 23 on the display apparatus 20 at the fourth time interval.

In Step S1219, the processing unit 12 drives the communication unit 13 to wirelessly transmit the cursor parameter for controlling the display position of the cursor 23 at the fourth time interval to the display apparatus 20 for control the the display position of the cursor 23 on the display apparatus 20.

It is worth note that the processing unit 12 can operatively store the first pointing coordinate, the second pointing coordinate, the third pointing coordinate, the fourth pointing coordinate, the first displacement vector, the second displacement vector, and the compensating vector per unit displacement in the memory unit 15. Those skilled in the art shall be able to program the processing unit 12 to utilize the method depicted in FIG. 10 and operatively detect whether the reference point 21 has exceeding the operating area of the image frame captured via firmware design. That is, the processing unit 12 can automatically determine whether the reference point 21 has exceeds the operating area according to the first and second axial coordinates associated with the first pointing coordinate, the second pointing coordinate, the third pointing coordinate, the fourth pointing coordinate after obtaining the described pointing coordinates. Thereby, the handheld pointer device 10 can prevent the cursor 23 from moving out of the display area of the display apparatus 20. It shall be noted that FIG. 12 is merely a pointer positioning method for the handheld pointer device 10 and the present disclosure is not limited thereto.

(Another Exemplary Embodiment of Relative Positioning Method)

Figure 13:
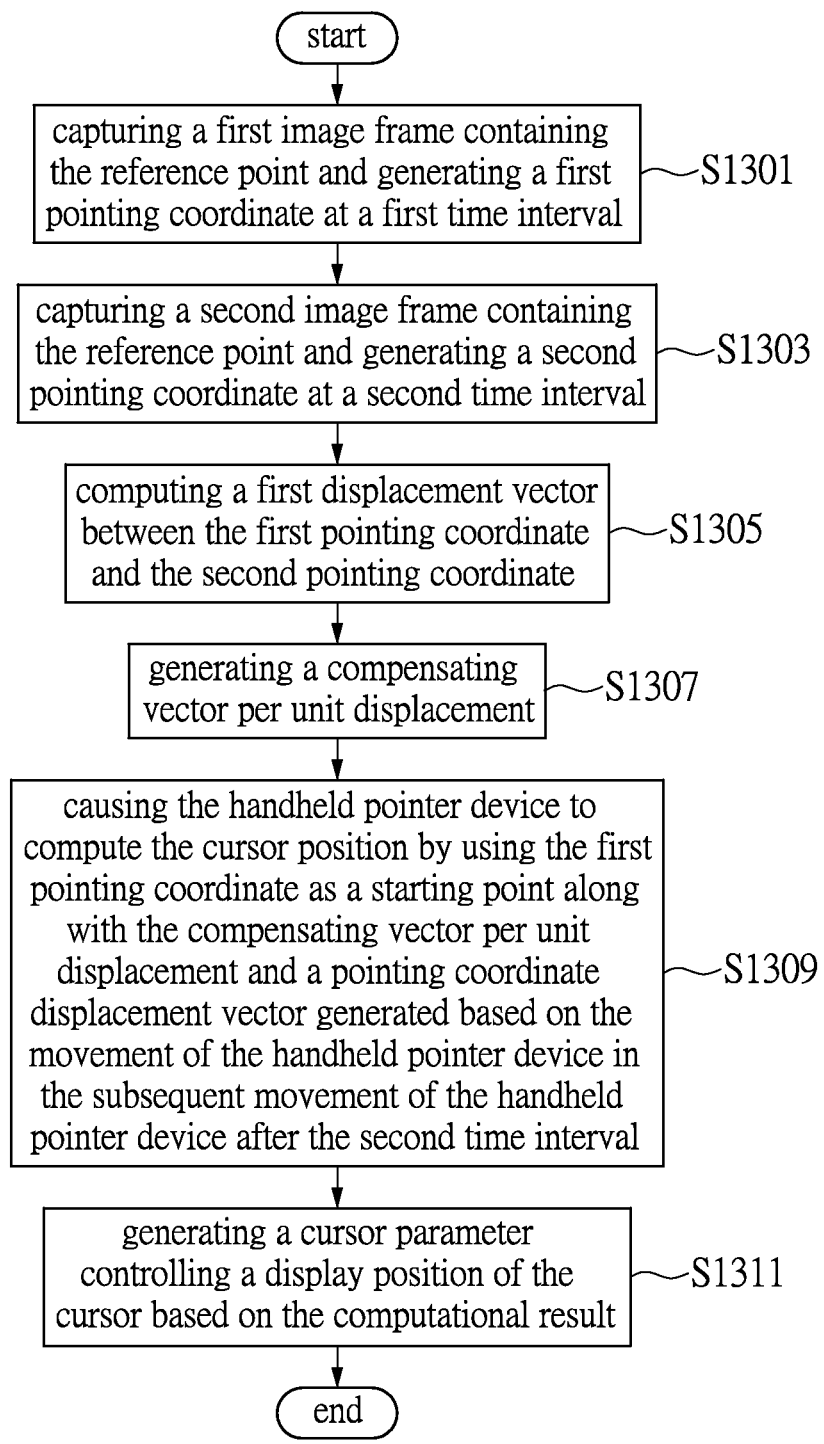
FIG. 13 is a flowchart diagram illustrating a pointer positioning method provided in accordance to another exemplary embodiment of the present disclosure.

From the aforementioned exemplary embodiments, the present disclosure can generalize another pointer positioning method for the aforementioned handheld pointer device of the interactive system. Please refer to FIG. 13 in conjunction with FIG. 1 and FIG. 2. FIG. 13 shows a flowchart diagram illustrating a pointer positioning method provided in accordance to another exemplary embodiment of the present disclosure.

The pointer positioning method of FIG. 13 can be implemented by programming the processing unit 12 via firmware design and executed by the processing unit 12 while the handheld pointer device 10 is in operation.

In Step 1301, the image capturing unit 11 of the handheld pointer device 10 is driven to capture and generate a first image frame containing the reference point 21 at a first time interval for the processing unit 12 to compute a first pointing coordinate of the handheld pointer device 12 relative to the display apparatus 20 at the first time interval according to the image position of the reference point 21 formed in the first image frame. The processing unit 12 further fixedly positions the display position of the cursor 23 at the first pointing coordinate according to the first pointing coordinate computed and causes the handheld pointer device 10 to enter the pointer-lock mode.

In Step S1303, at a second time interval, the processing unit 12 drives the image capturing unit 11 to capture and generate a second image frame containing the reference point 21 at the second time interval. The processing unit 12 computes a second pointing coordinate of the handheld pointer device 10 relative to the display apparatus 20 according to the image position of the reference point 21 formed in the second image frame and causes the handheld pointer device 10 to exit from the pointer-lock mode. The second time interval occurs after the first time interval. That is, the second image frame is captured at a later time than the first image frame.

In Step S1305 the processing unit 12 of the handheld pointer device 10 computes a first displacement vector between the first pointing coordinate and the second pointing coordinate.

In Step S1307, the processing unit 12 operatively generates a compensating vector per unit displacement according to the first displacement vector. As described previously, the processing unit 12 can compute the compensating vector per unit displacement according to a preset number of calibrations or a preset calibration time. In one embodiment, the handheld pointer device 10 can generate the compensating vector per unit displacement by dividing the preset number of calibrations or the preset calibration time from the first displacement vector.

In Step S1309, the processing unit 12 cause the handheld pointer device to compute the cursor position by using the first pointing coordinate as a starting point along with the compensating vector per unit displacement and a pointing coordinate displacement vector generated based on the movement of the handheld pointer device in the subsequent movement of the handheld pointer device after the second time interval. More specifically, the processing unit 12 initiates a pointing coordinate calibration program at a third time interval to cause the handheld pointer device 10 to compute the cursor position of the cursor at the third time interval in the relative positioning mode. The implementation of the relative positioning mode is the same as described in the aforementioned embodiment, and further descriptions are hereby omitted.

In Step S1311, the processing unit 12 generates the cursor parameter for controlling the movement of the cursor 23 on the display apparatus 20. The processing unit 12 drives the communication unit 13 to wirelessly transmit the cursor parameter to the display apparatus 20 to control the display position of the cursor 23 on the display apparatus 20 at the third time interval.

It shall be noted that FIG. 13 is merely a pointer positioning method for the handheld pointer device 10 and the present disclosure is not limited thereto.

In summary, exemplary embodiments of the present disclosure provide a pointer positioning method of a handheld pointer device, which can actively computes the movement of the handheld pointer device through detecting the image position of at least a reference point in image frames captured and determines whether to cause the handheld pointer device enter or exit the pointer-lock mode. The handheld pointer device automatically computes the position of cursor in an absolute positioning mode after completed a pointing coordinate calibrating program, so as to prevent the occurrence of the cursor suddenly jump from one place to another.

The pointer positioning method further can automatically perform boundary calibration to the absolute pointing coordinate computed in accordance with the reference point when detected that the cursor moved out of the display edge of the display apparatus as a result of the reference point lying outside of the operating area of the image frame captured.

Accordingly, the pointer positioning method of the present disclosure can through actively and selectively correct the absolute pointing coordinate associated with the reference point based on the operation mode of the handheld pointer device, maintains the directivity of the handheld pointer device, thereby enhance the stability of the handheld pointer device and at the same time, the operation convenience and of the user.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A pointer positioning method of a handheld pointer device, comprising:
   capturing a first image frame containing a reference point to compute a first pointing coordinate according to the image position of the reference point formed in the first image frame;
   generating a cursor parameter for controlling a display position of a cursor on a display apparatus according to the first pointing coordinate;
   recording the first pointing coordinate and positioning the display position of the cursor at the first pointing coordinate on the display apparatus when the handheld pointer device enters a pointer-lock mode;
   capturing a second image frame to compute a second pointing coordinate according to the image position of the reference point formed in the second image frame and generating a displacement vector between the first pointing coordinate and the second pointing coordinate when the handheld pointer device exits the pointer-lock mode; and
   computing a cursor position according to the displacement vector and the first pointing coordinate for compensating an offset between the first pointing coordinate and the second pointing coordinate, and generating the cursor parameter for controlling the movement of the cursor based on the computational result.

2. The pointer positioning method according to claim 1, wherein the step of computing the cursor position according to the displacement of the first pointing coordinate comprises:
   initiating a pointing coordinate calibration program to cause the handheld pointer device to compute the cursor position in a relative positioning mode, wherein under the relative positioning mode, the handheld pointer device computes the cursor position of the cursor in the subsequent movement by using the first pointing coordinate as a starting point along with a pointing coordinate displacement vector, wherein the pointing coordinate displacement vector is generated based on the displacement vector and the movement of the handheld pointer device and the pointing coordinate displacement vector is the displacement between two pointing coordinates computed in consecutive intervals.

3. The pointer positioning method according to claim 2, wherein the step of computing the cursor position in the relative positioning mode comprises:
   a) setting a number of calibrations as N, a compensation vector as C, and a starting point coordinate, wherein C is equal to the displacement vector divided by N, and the starting point coordinate is the first pointing coordinate;
   b) computing the pointing coordinate displacement vector generated based on the movement of the handheld pointer device;
   c) computing the sum of the starting point coordinate, the pointing coordinate displacement vector of the handheld pointer device, and C to generate a relative pointing coordinate;
   d) generating the cursor parameter to control the movement of the cursor on the display apparatus according to the relative pointing coordinate;
   e) setting the relative pointing coordinate to be the starting pointing coordinate and executing N−1;
   f) determining whether N is equal to zero; and
   g) returning to step b) upon determined that N is not equal to zero.

4. The pointer positioning method according to claim 3, wherein the step of computing the cursor position in the relative positioning mode further comprises:
   h) when determined that N is equal to zero, causes the handheld pointer device to compute the cursor position in an absolute positioning mode.

5. The pointer positioning method according to claim 3, wherein N is configured according to a frame capturing rate of the handheld pointer device for capturing image frames containing the reference point.

6. The pointer positioning method according to claim 5, wherein the frame capturing rate is configured according to a preset calibration time interval determined by a user.

7. The pointer positioning method according to claim 1, wherein the step of the handheld pointer device entering the pointer-lock mode comprises:
   causing the handheld pointer device to continuously output the cursor parameter to fix the display position of the cursor on the display apparatus.

8. The pointer positioning method according to claim 1, the step of the handheld pointer device entering the pointer-lock mode comprises:
   causing the handheld pointer device to stop outputting the cursor parameter so as to fix the display position of the cursor on the display apparatus.

9. The pointer positioning method according to claim 1, wherein the handheld pointer device enters the pointer-lock mode when determined that a pointing coordinate displacement vector is less than a predetermined displacement threshold, wherein the pointing coordinate displacement vector is the displacement between two pointing coordinates computed in consecutive intervals.

10. The pointer positioning method according to claim 1, wherein the handheld pointer device enters the pointer-lock mode when determines that a pointing coordinate displacement vector is less than a predetermined displacement threshold and the consecutive moving directions of the handheld pointer device are different, wherein the pointing coordinate displacement vector is the displacement between two pointing coordinates computed in consecutive intervals.

11. The pointer positioning method according to claim 1, wherein the handheld pointer device exits the pointer-lock mode when determines that a pointing coordinate displacement vector is greater than a predetermined displacement threshold, wherein the pointing coordinate displacement vector is the displacement between two pointing coordinates computed in consecutive intervals.

12. The pointer positioning method according to claim 1, wherein the whether the handheld pointer device enters or exits the pointer-lock mode is controlled by a button unit of the handheld pointer device.

13. The pointer positioning method according to claim 1, wherein after the step of computing the first pointing coordinate comprises:
   determining whether the first pointing coordinate lies outside of an operating area of the first image frame;
   wherein the first pointing coordinate comprises a first axial coordinate and a second axial coordinate, and the operating area corresponds to a screen of the display apparatus and scaled with a predefined display ratio, wherein the operating area is an area bounded by an upper limit of a first axis, a lower limit of the first axis, an upper limit of a second axis, and a lower limit of the second axis, wherein the upper limit of the first axis corresponds to a first display edge of the display apparatus, the lower limit of the first axis corresponds to a second display edge of the display apparatus, the upper limit of the second axis corresponds to a third display edge of the display apparatus, and the lower limit of the second axis corresponds to a fourth display edge of the display apparatus.

14. The pointer positioning method according to claim 13, wherein the step of determining whether the first pointing coordinate lies outside of the operating area comprises:
   when determined that the first axial coordinate is greater than the upper limit of the first axis, the handheld pointer device operatively outputs the cursor parameter to cause the movement of the cursor along the first axis to be fixed at the first display edge;
   when determined that the first axial coordinate is less than the lower limit of the first axis, the handheld pointer device operatively outputs the cursor parameter to cause the movement of the cursor along the first axis to be fixed at the second display edge;
   when determined that the second axial coordinate is greater than the upper limit of the second axis, the handheld pointer device operatively outputs the cursor parameter to cause the movement of the cursor along the second axis to be fixed at the third display edge; and
   when determined that the second axial coordinate is less than the lower limit of the second axis, the handheld pointer device operatively outputs the cursor parameter to cause the movement of the cursor along the second axis to be fixed at the fourth display edge.

15. A pointer positioning method of a handheld pointer device, comprising:
   capturing a first image frame containing a reference point to compute a first pointing coordinate according to the image position of the reference point formed in the first image frame;
   generating a cursor parameter for controlling a display position of a cursor on a display apparatus according to the first pointing coordinate;
   recording the first pointing coordinate and positioning the display position of the cursor at the first pointing coordinate on the display apparatus when the handheld pointer device enters a pointer-lock mode;
   causing the handheld pointer device to compute a cursor position of the cursor for the subsequent movement by using the first pointing coordinate as a starting point along with a pointing coordinate displacement vector generated based on the movement of the handheld pointer device after the handheld pointer device has exited from the pointer-lock mode; and
   generating the cursor parameter for controlling the movement of the cursor based on the computational results.

16. The pointer positioning method according to claim 15, wherein the step of computing the cursor position comprises:
   capturing a second image frame and computing a displacement vector according to the first pointing coordinate and the image position of the reference point formed in the second image frame; and
   initiating a pointing coordinate calibration program to cause the handheld pointer device to compute the cursor position in a relative positioning mode, wherein in the relative positioning mode, the handheld pointer device computes the cursor position of the cursor in the subsequent movement by using the first pointing coordinate as the starting point along with the displacement vector and the pointing coordinate displacement vector generated based on the movement of the handheld pointer device.

17. The pointer positioning method according to claim 16, wherein the step of computing the cursor position in the relative positioning mode comprises:
   a) setting a number of calibrations as N, a compensation vector as C and a starting point coordinate, wherein C is equal to the displacement vector divided by N, and the starting point coordinate is the first pointing coordinate;
   b) computing the pointing coordinate displacement vector generated based on the movement of the handheld pointer device;
   c) computing the sum of the starting point coordinate, the pointing coordinate displacement vector of the handheld pointer device, and C to generate a relative pointing coordinate;
   d) generating the cursor parameter to control the movement of the cursor on the display apparatus according to the relative pointing coordinate;
   e) setting the relative pointing coordinate to be the starting pointing coordinate and executing N−1;
   f) determining whether N is equal to zero; and
   g) returning to step b) upon determined that N is not equal to zero.

18. The pointer positioning method according to claim 15, wherein the step of the handheld pointer device entering the pointer-lock mode comprises:

causing the handheld pointer device to continuously output the cursor parameter to fix the display position of the cursor on the display apparatus.

19. The pointer positioning method according to claim 15, the step of the handheld pointer device entering the pointer-lock mode comprises:

causing the handheld pointer device to stop outputting the cursor parameter so as to fix the display position of the cursor on the display apparatus.

20. A pointer positioning method of a handheld pointer device, comprising:

generating a first pointing coordinate at a first time interval and fixedly positioning a display position of a cursor at the first pointing coordinate;

generating a second pointing coordinate at a second time interval, wherein the second time interval occurs after the first time interval;

computing a first displacement vector between the first pointing coordinate and the second pointing coordinate;

generating a compensating vector per unit displacement according to the first displacement vector;

generating a third pointing coordinate at a third time interval, wherein the third time interval occurs after the second time interval;

computing a second displacement vector between the third pointing coordinate and the second pointing coordinate; and computing the cursor position at the third time interval according to the first pointing coordinate, the compensating vector per unit displacement, and the second displacement vector.

21. The pointer positioning method according to claim 20, further comprising:

generating a fourth pointing coordinate at a fourth time interval, wherein the fourth time interval occurs after the third time interval;

computing the cursor position at the fourth time interval according to the fourth pointing coordinate; and generating a cursor parameter for controlling the display position of the cursor at the fourth time interval.

22. The pointer positioning method according to claim 20 wherein the step of computing the cursor position at the third time interval according to the first pointing coordinate, the compensating vector per unit displacement, and the second displacement vector comprises:

initiating a pointing coordinate calibration program at the third time interval to cause the handheld pointer device to compute the cursor position in a relative positioning mode at the third time interval, wherein under the relative positioning mode, the handheld pointer device computes the cursor position in the subsequent movement by using the first pointing coordinate as a starting point along with the compensating vector per unit displacement, and the second displacement vector.

23. The pointer positioning method according to claim 22, wherein the step of computing the cursor position in the relative positioning mode comprises:

a) setting a number of calibrations as N, a compensation vector as C and a starting point coordinate, wherein C is equal to the first displacement vector divided by N, and the starting point coordinate is the first pointing coordinate;

b) computing the second displacement vector according to the third pointing coordinate;

c) computing the sum of the starting point coordinate, the second displacement vector, and C to generate a relative pointing coordinate;

d) generating the cursor parameter to correspondingly control the display position of the cursor according to the relative pointing coordinate;

e) setting the relative pointing coordinate to be the starting pointing coordinate and executing N−1;

f) determining whether N is equal to zero; and g) returning to step b) upon determined that N is not equal to zero.

24. The pointer positioning method according to claim 20, wherein the step of fixedly positioning the display position of the cursor on the first pointing coordinate comprises:

causing the handheld pointer device to continuously output a cursor parameter for positioning the display position of the cursor at the first pointing coordinate so as to fix the cursor at the first pointing coordinate at the first time interval.

25. The pointer positioning method according to claim 20, wherein the step of fixedly positioning the display position of the cursor on the first pointing coordinate comprises:

stop outputting a cursor parameter for controlling the display position of the cursor at the first pointing coordinate so as to fix the cursor at the first pointing coordinate at the first time interval.

26. The pointer positioning method according to claim 20, wherein after the step of computing the first pointing coordinate comprise:

determining whether the first pointing coordinate lies outside of an operating area of the first image frame;

wherein the first pointing coordinate comprises a first axial coordinate and a second axial coordinate, and the operating area corresponds to a screen of the display apparatus and scaled with a predefined display ratio, wherein the operating area is an area bounded by an upper limit of a first axis, a lower limit of the first axis, an upper limit of a second axis, and a lower limit of the second axis, wherein the upper limit of the first axis corresponds to a first display edge of the display apparatus, the lower limit of the first axis corresponds to a second display edge of the display apparatus, the upper limit of the second axis corresponds to a third display edge of the display apparatus, and the lower limit of the second axis corresponds to a fourth display edge of the display apparatus.

27. The pointer positioning method according to claim 26, wherein the step of determining whether the first pointing coordinate lies outside of the operating area comprises:

when determined that the first axial coordinate is greater than the upper limit of the first axis, the handheld pointer device operatively outputs the cursor parameter to cause the movement of the cursor along the first axis to be fixed at the first display edge;

when determined that the first axial coordinate is less than the lower limit of the first axis, the handheld pointer device operatively outputs the cursor parameter to cause the movement of the cursor along the first axis to be fixed at the second display edge;

when determined that the second axial coordinate is greater than the upper limit of the second axis, the handheld pointer device operatively outputs the cursor parameter to cause the movement of the cursor along the second axis to be fixed at the third display edge; and when determined that the second axial coordinate is less than the lower limit of the second axis, the handheld pointer device operatively outputs the cursor parameter to cause the movement of the cursor along the second axis to be fixed at the fourth display edge.

28. A pointer positioning method of a handheld pointer device, comprising:
- generating a first pointing coordinate at a first time interval to cause the handheld pointer device to enter a pointer-lock mode and fixedly positioning a display position of a cursor at the first pointing coordinate;
- generating a second pointing coordinate at a second time interval to cause the handheld pointer device to exit the pointer-lock mode, wherein the second time interval occurs after the first time interval;
- computing a first displacement vector between the first pointing coordinate and the second pointing coordinate;
- generating a compensating vector per unit displacement according to the first displacement vector;
- wherein causes the handheld pointer device to compute the cursor position in the subsequent movement of the handheld pointer device after the second time interval by using the first pointing coordinate as a starting point along with the compensating vector per unit displacement and a pointing coordinate displacement vector generated based on the movement of the handheld pointer device.

29. The pointer positioning method according to claim 28, during the computation of the cursor position after the second time interval comprises:
- generating a cursor parameter controlling the display position of the cursor based on the computational result of the cursor position.

30. The pointer positioning method according to claim 28, wherein during the computation of the cursor position after the second time interval comprises:
- initiating a pointing coordinate calibration program at a third time interval to cause the handheld pointer device to compute the cursor position in a relative positioning mode at the third time interval, wherein under the relative positioning mode, the handheld pointer device computes the cursor position in the subsequent movement of the handheld pointer device after the second time interval by using the first pointing coordinate as a starting point along with the compensating vector per unit displacement and the pointing coordinate displacement vector generated based on the movement of the handheld pointer device, wherein the pointing coordinate displacement vector is generated according to the displacement vector and the movement of the handheld pointer device and the pointing coordinate displacement vector is the displacement between two pointing coordinates computed in consecutive intervals.

31. The pointer positioning method according to claim 30, wherein the step of computing the cursor position in the relative positioning mode comprises:
- a) setting a number of calibrations as N, a compensation vector as C and a starting point coordinate, wherein C is equal to the first displacement vector divided by N, and the starting point coordinate is the first pointing coordinate;
- b) computing the pointing coordinate displacement vector generated based on the movement of the handheld pointer device;
- c) computing the sum of the starting point coordinate, the second displacement vector, and C to generate a relative pointing coordinate;
- d) generating a cursor parameter to correspondingly control the display position of the cursor according to the relative pointing coordinate;
- e) setting the relative pointing coordinate to be the starting pointing coordinate and executing N−1;
- f) determining whether N is equal to zero; and
- g) returning to step b) upon determined that N is not equal to zero.

* * * * *